US009511970B2

(12) United States Patent
Morimoto

(10) Patent No.: US 9,511,970 B2
(45) Date of Patent: Dec. 6, 2016

(54) ORIGINAL TRANSPORT DEVICE AND IMAGE FORMING APPARATUS

(71) Applicant: Sharp Kabushiki Kaisha, Osaka-shi, Osaka (JP)

(72) Inventor: Yasumasa Morimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/705,068

(22) Filed: May 6, 2015

(65) Prior Publication Data

US 2015/0362874 A1    Dec. 17, 2015

(30) Foreign Application Priority Data

Jun. 17, 2014 (JP) ................................. 2014-124636

(51) Int. Cl.
| | |
|---|---|
| *B65H 5/06* | (2006.01) |
| *B65H 29/12* | (2006.01) |
| *G03G 15/00* | (2006.01) |
| *H04N 1/00* | (2006.01) |
| *B65H 29/14* | (2006.01) |
| *B65H 85/00* | (2006.01) |

(52) U.S. Cl.
CPC ............ *B65H 29/125* (2013.01); *B65H 5/062* (2013.01); *B65H 29/14* (2013.01); *B65H 85/00* (2013.01); *G03G 15/602* (2013.01); *H04N 1/00* (2013.01); *B65H 2301/33312* (2013.01); *B65H 2404/143* (2013.01); *B65H 2404/1442* (2013.01); *B65H 2555/13* (2013.01); *B65H 2601/525* (2013.01); *B65H 2801/39* (2013.01)

(58) Field of Classification Search
CPC ... B65H 5/062; B65H 29/125; B65H 2404/14; B65H 2404/142; B65H 2404/1421; B65H 2404/144; B65H 2404/1441; H04N 1/0057; H04N 1/00602; G03G 15/6552; G03G 15/6555; G03G 15/657; G03G 15/6573
USPC ......................................... 271/273, 274, 314
See application file for complete search history.

(56) References Cited

U.S. PATENT DOCUMENTS 4,448,559 A * 5/1984 Matsuda .................. B41J 11/50
                                                      235/58 CF
2005/0263956 A1   12/2005 Uchida et al.

FOREIGN PATENT DOCUMENTS

JP          2005-335915 A      12/2005

* cited by examiner

*Primary Examiner* — David H Bollinger
(74) *Attorney, Agent, or Firm* — Keating & Bennett, LLP

(57) ABSTRACT

An original transport device having paper discharge rollers constituted by a fixing roller in a fixed position and a separate/contact roller separating from/making contact with the fixing roller, for sandwiching and transporting an original in an original transport path, includes: a swinging support member supporting the separate/contact roller and swinging so that the separate/contact roller is separated from/press-contacted to the fixing roller; an operation unit coupled to the swinging support member to swing the swinging support member; and a locking member locking the swinging support member to stop the swing thereof. The locking member locks the swinging support member so that the paper discharge rollers are in a separate state or a press-contact state when the operation unit is driven, and after the operation unit is turned off, the locking member maintains the separate state or the press-contact state during driving of the operation unit.

17 Claims, 17 Drawing Sheets

ORIGINAL TRANSPORT DEVICE AND IMAGE FORMING APPARATUS

CROSS-REFERENCE TO RELATED APPLICATIONS

This application claims priority under 35 U.S.C. §119 (a) on Patent Application No. 2014-124636 filed in Japan on Jun. 17, 2014. The entire contents of which are herein incorporated by reference.

BACKGROUND OF THE INVENTION

Field of the Invention

The present invention relates to an original transport device and an image forming apparatus, the original transport device being provided with a pair of paper discharge rollers in an original transport path so as to sandwich and transport an original.

Description of the Related Art

Conventionally, in an original transport device mounted on an image forming apparatus, an original is sandwiched by two rollers provided in an original transport path and is transported. In such an original transport device, when the original get jammed to cause a trouble in transport such as a paper jam, the two rollers are separated from each other so that operational efficiency is improved when a user collects the jammed original.

A double-sided original transport device disclosed in JP 2005-335915 A (hereinafter referred to as "Patent Document 1") includes: a transport unit having a paper discharge roller; and a fixing unit rotatably holding a pinch roller for pressing an original against the paper discharge roller from the lower side. The transport unit has a mechanism to separate the paper discharge roller upward centering the rotational shaft. The paper discharge roller is pressed against the pinch roller by a pressing spring, and separated from the pinch roller by rotating a release lever that is driven by a solenoid. Thus, in the configuration disclosed by Patent Document 1, the paper discharge roller is press-contacted to/separated from the pinch roller by driving the solenoid. Accordingly, in order to maintain either of the above two states, it is necessary to drive continually the solenoid.

For example, if the paper discharge roller is configured to be separated from the pinch roller when the solenoid is turned on, it is necessary to maintain the separate state of the paper discharge roller until the user collects the original. Thus, electrical power supply to the solenoid should not be stopped. Or, if the paper discharge roller is configured to be press-contacted to the pinch roller when the solenoid is turned on, it is necessary to turn on the solenoid when transporting the original, regardless of whether it is a case of single side reading or double side reading. Thus, driving sound of the solenoid is generated. Furthermore, when such a process is performed continuously and with high speed, the solenoid is turned on and off repeatedly, which results in loud noise.

The present invention was made to resolve the above problems, and an object of the present invention is to provide an original transport device and an image forming apparatus with which the operation time of the solenoid can be reduced and energy can be saved.

SUMMARY OF THE INVENTION

An original transport device according to the present invention is provided with a pair of paper discharge rollers for sandwiching and transporting an original in an original transport path. The paper discharge rollers are constituted by a fixing roller located in a fixed position and a separate/contact roller separating from/making contact with the fixing roller. The original transport device includes: a swinging support member supporting the separate/contact roller and swinging so that the separate/contact roller is separated from/press-contacted to the fixing roller; an operation unit coupled to the swinging support member so as to swing the swinging support member; and a locking member locking the swinging support member so as to stop the swing of the swinging support member. The locking member locks the swinging support member so that the paper discharge rollers are in a separate state or a press-contact state when the operation unit is driven, and after the operation unit is turned to a non-driven state, the locking member maintains the separate state or the press-contact state of the paper discharge rollers during driving of the operation unit.

In the original transport device according to the present invention may have a configuration in which: the swinging support member swings toward a direction in which the paper discharge rollers are press-contacted to each other when the operation unit is not driven and swings toward a direction in which the paper discharge rollers are separated from each other when the operation unit is driven; and the locking member maintains the separate state of the paper discharge rollers.

In the original transport device according to the present invention may have a configuration in which: the swinging support member swings toward a direction in which the paper discharge rollers are separated from each other when the operation unit is not driven and swings toward a direction in which the paper discharge rollers are press-contacted to each other when the operation unit is driven; and the locking member maintains the press-contact state of the paper discharge rollers.

In the original transport device according to the present invention may have a configuration in which: the operation unit is driven by a solenoid; the operation unit being driven biases the swinging support member in one direction; and the operation unit not being driven applies no load to the swinging support member.

In the original transport device according to the present invention may have a configuration further including a biasing member being coupled to the swinging support member so as to bias the swinging support member in a direction opposite to the direction in which the operation unit biases the swinging support member.

In the original transport device according to the present invention may have a configuration further including an original detection sensor detecting a position of the original in the original transport path, the configuration in which it is detected that a paper jam exists in the original transport path based on the position of the original detected by the original detection sensor so that the paper discharge rollers are separated from each other.

In the original transport device according to the present invention may have a configuration further including a power unit rotating the fixing roller forward and backward, the configuration in which the locking member moves, accompanied by the rotation of the fixing roller, between a locking position for locking the swinging support member and a releasing position separated from the swinging support member.

An image forming apparatus according to the present invention includes the original transport device according to the present invention.

With the present invention, by locking the swinging support member using the locking member, it is possible to maintain the separate/press-contact state of the paper discharge rollers even when the operation unit in not driven. As a result, it is possible to reduce an operation time of the operation unit, which results in energy saving.

BRIEF DESCRIPTIONS OF THE DRAWINGS

FIG. 9 is an enlarged side view illustrating an original passing by.

DESCRIPTION OF THE PREFERRED EMBODIMENTS

First Embodiment

Hereinafter, an image forming apparatus according to an embodiment of the present invention will be described with reference to the drawings.

Figure 1:
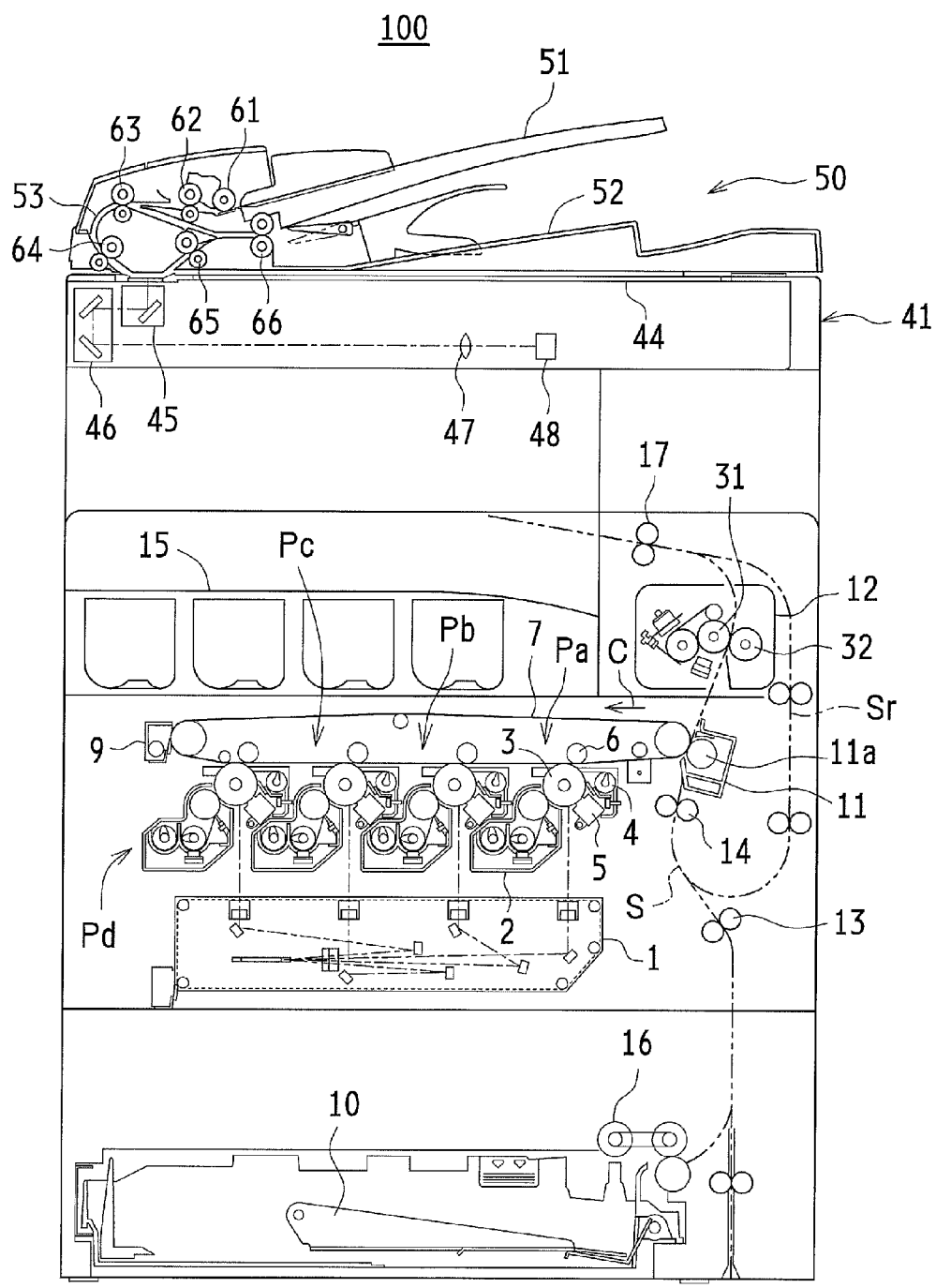
FIG. 1 is a schematic side view of an image forming apparatus according to an embodiment of the present invention.

FIG. 1 is a schematic side view of the image forming apparatus according to the embodiments of the present invention.

An image forming apparatus 100, which is a multifunction machine having a scanning function, a copying function, a printing function, a facsimile function and the like, transmits an image of an original read by an image reading device to the outside (corresponding to the scanning function), and records such a read image of the original or an image received from the outside on a sheet of paper in colors or in monochrome (corresponding to the copying function, the printing function and the facsimile function).

On an image reading device 41, an original transport device (ADF) 50 is provided, which is openably/closably supported relative to the image reading device 41. When the original transport device 50 is opened, an original platen 44 on the upper portion of the image reading device 41 is exposed so that the original can be placed thereon manually. Also, the original transport device 50 automatically transports the original placed on an original tray 51 onto the image reading device 41. The image reading device 41 reads the original placed thereon or transported by the original transport device 50 so as to generate image data. The original transport device 50 and the image reading device 41 will be described in detail later referring to FIG. 2.

The image forming apparatus 100 includes: an optical scanning device 1, a development device 2, a photosensitive drum 3, a drum cleaner 4, a charger 5, an intermediate transfer belt 7, a fixing device 12, a paper transport path S, a paper feed tray 10, a stacking tray 15 and the like.

The image forming apparatus 100 handles image data corresponding to a color image using black (K), cyan (C), magenta (M) and yellow (Y) or corresponding to a monochrome image using a single color (e.g., black). The image forming apparatus 100 includes, in order to generate four kinds of toner images, each four development devices 2, photosensitive drums 3, drum cleaners 4 and chargers 5 respectively associated with black, cyan, magenta, and yellow. Thus, four image stations Pa, Pb, Pc, and Pd are constituted.

The drum cleaner 4 removes and collects residual toner on a surface of the photosensitive drum 3. The charger 5 charges the surface of the photosensitive drum 3 at a predetermined potential uniformly. The optical scanning device 1 causes the surface of the photosensitive drum 3 to be exposed to light so as to generate an electrostatic latent image. The development device 2 develops the electrostatic latent image on the surface of the photosensitive drum 3 so as to form a toner image on the photosensitive drum 3. By the above-described series of operations, each toner image of the corresponding color is formed on the corresponding surface of the photosensitive drum 3.

On the photosensitive drum 3, an intermediate transfer roller 6 is disposed via the intermediate transfer belt 7. The intermediate transfer belt 7 moves around in the direction indicated by an arrow C so that a belt cleaner 9 removes and collects residual toner on the intermediate transfer belt 7. On the intermediate transfer belt 7, the toner image of each color formed on the corresponding surface of the photosensitive drum 3 is sequentially transferred and superimposed to each other, thus, a color toner image is formed on the surface of the intermediate transfer belt 7.

A nip area is formed between a transfer roller 11a of a secondary transfer unit 11 and the intermediate transfer belt 7. A sheet transported through the paper transport path S is nipped by the nip area to be transported. The toner image on the surface of the intermediate transfer belt 7 is transferred to the sheet when it passes through the nip area, and then the sheet is transported to the fixing device 12.

The fixing device 12 includes a fixing roller 31 and a pressure roller 32 that rotate while sandwiching the sheet. In the fixing device 12, the sheet on which the toner image is transferred is sandwiched between the fixing roller 31 and the pressure roller 32 so that the sheet is heated and pressurized, thus the toner image is fixed on the sheet.

The paper feed tray 10, which is to stack the sheets used for image forming, is provided below the optical scanning device 1. The sheet is drawn out from the paper feed tray 10 by a paper pickup roller 16 and transported through the paper transport path S. Then the sheet goes through the secondary transfer unit 11 and the fixing device 12, and discharged to the stacking tray 15 via discharge rollers 17. The paper transport path S is provided with: paper registration rollers 14 that temporary stop the sheet so as to align the leading end of the sheet and then restart the transport of the sheet at a timing in synchronization with the transfer timing of the color toner image in the nip area between the intermediate transfer belt 7 and the transfer roller 11a; transport rollers 13 that transport the sheet; and the discharge rollers 17.

When the image is formed not only on the surface of the sheet but also on the rear surface of the sheet, the sheet is transported in the reverse direction from the discharge rollers 17 to a reverse paper path Sr so as to reverse the side of the sheet. Then the sheet is guided again to the paper registration rollers 14 so that an image is formed on the rear surface of the sheet similarly to the surface thereof. Thus, the sheet is discharged to the stacking tray 15.

Figure 2:
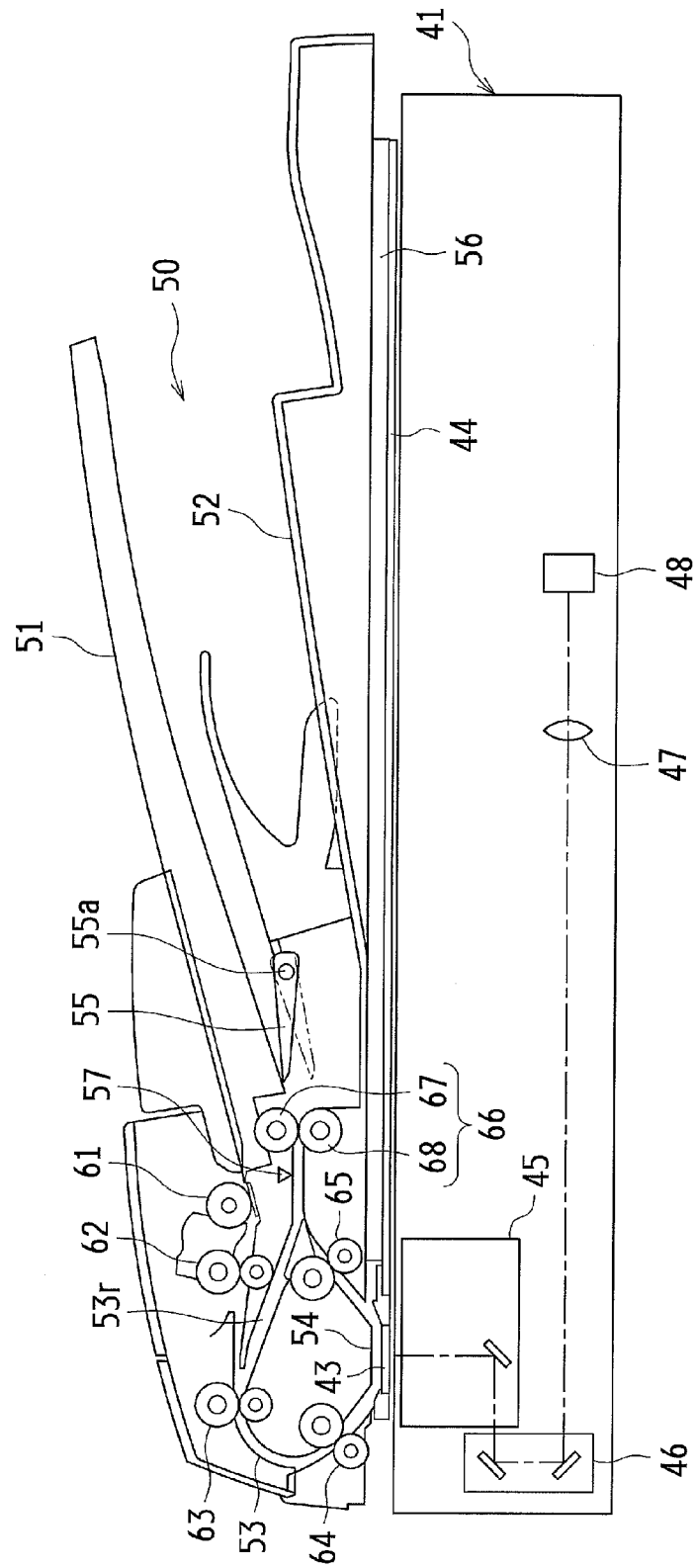
FIG. 2 is an enlarged side view illustrating an image reading device and an original transport device.

FIG. 2 is an enlarged side view illustrating the image reading device and the original transport device.

The image reading device 41 includes: an original reading glass 43, the original platen 44, a first scanning unit 45, a second scanning unit 46, an imaging lens 47, an original reading unit 48 and the like. The original reading glass 43 and the original platen 44 are provided on the image reading device 41. The first scanning unit 45 is located below the original reading glass 43 or the original platen 44, and moves along the original platen 44. The first scanning unit 45 causes the original on the original reading glass 43 or the original platen 44 to be exposed to light and guides a reflected light to the second scanning unit 46. The second scanning unit 46 moves following the first scanning unit 45 while guiding the reflected light from the original to the imaging lens 47. The imaging lens 47 collects the reflected light from the original onto the original reading unit 48, thus the image on the surface of the original is imaged on the original reading unit 48. The original reading unit 48 is a charge coupled device (CCD) and generates image data based on the image of the read original.

Also, the image reading device 41 can read the original transported by the original transport device 50. In this case, the first scanning unit 45 is stopped below the original reading glass 43, and causes the original passing between the original reading glass 43 and a reading guide plate 54 of the original transport device 50 to be exposed to light.

In the original transport device 50, the original placed on the original tray 51 is supplied to the original transport path 53 via a pickup roller 61. In the original transport path 53, the original goes through the pickup roller 61, a feed roller 62, a registration roller 63, a pre reading roller 64, a post reading roller 65 and paper discharge rollers 66, in this order from the side of the original tray 51. Then, the original is read by the image reading device 41 and discharged to a discharge tray 52. The original transport path 53 includes a reverse transport path 53r that is branched from the original transport path 53 between the post-reading roller 65 and the paper discharge rollers 66, and that joins to the original transport path 53 between the feed roller 62 and the registration roller 63.

The paper discharge rollers 66 are made up of a fixing roller 67 located in a fixed position and a separate/contact roller 68 that makes press-contact with/separates from the fixing roller 67. In the paper discharge rollers 66 of this embodiment, the fixing roller 67 is located on the upper side and the separate/contact roller 68 is located on the lower side. Note that the configuration in which the separate/contact roller 68 makes press-contact with/separates from the fixing roller 67 will be described later in detail referring to FIGS. 7A and 7B. The registration roller 63 aligns the leading end of the transported original and transports it to the pre-reading roller 64. The reading guide plate 54 facing the original reading glass 43 is disposed between the pre-reading roller 64 and the post-reading roller 65. On the bottom surface of the original transport device 50, an original pressing plate 56 facing the original platen 44 is provided. The original pressing plate 56 presses the original when the original transport device 50 is closed, so that the original placed on the original platen 44 does not move. In the vicinity of the paper discharge rollers 66, an original detection sensor 57 is provided so as to detect the position of the original in the original transport path 53. The number of the original detection sensor 57 is not limited to one. A plurality of original detection sensors 57 may be provided at respective positions in the original transport path 53.

When reading the rear surface of the original, an intermediate tray 55 is rotated about a tray shaft 55a as indicated by the dashed-two dotted line. The original discharged from the paper discharge rollers 66 is received on the intermediate tray 55 and the paper discharge rollers 66 are stopped. Then, the paper discharge rollers 66 are rotated backward, thereby the original returned to the original transport path 53 passes through the reverse transport path 53r and is guided to the registration roller 63. Thus, the original whose side is reversed passes on the original reading glass 43.

Figure 3:
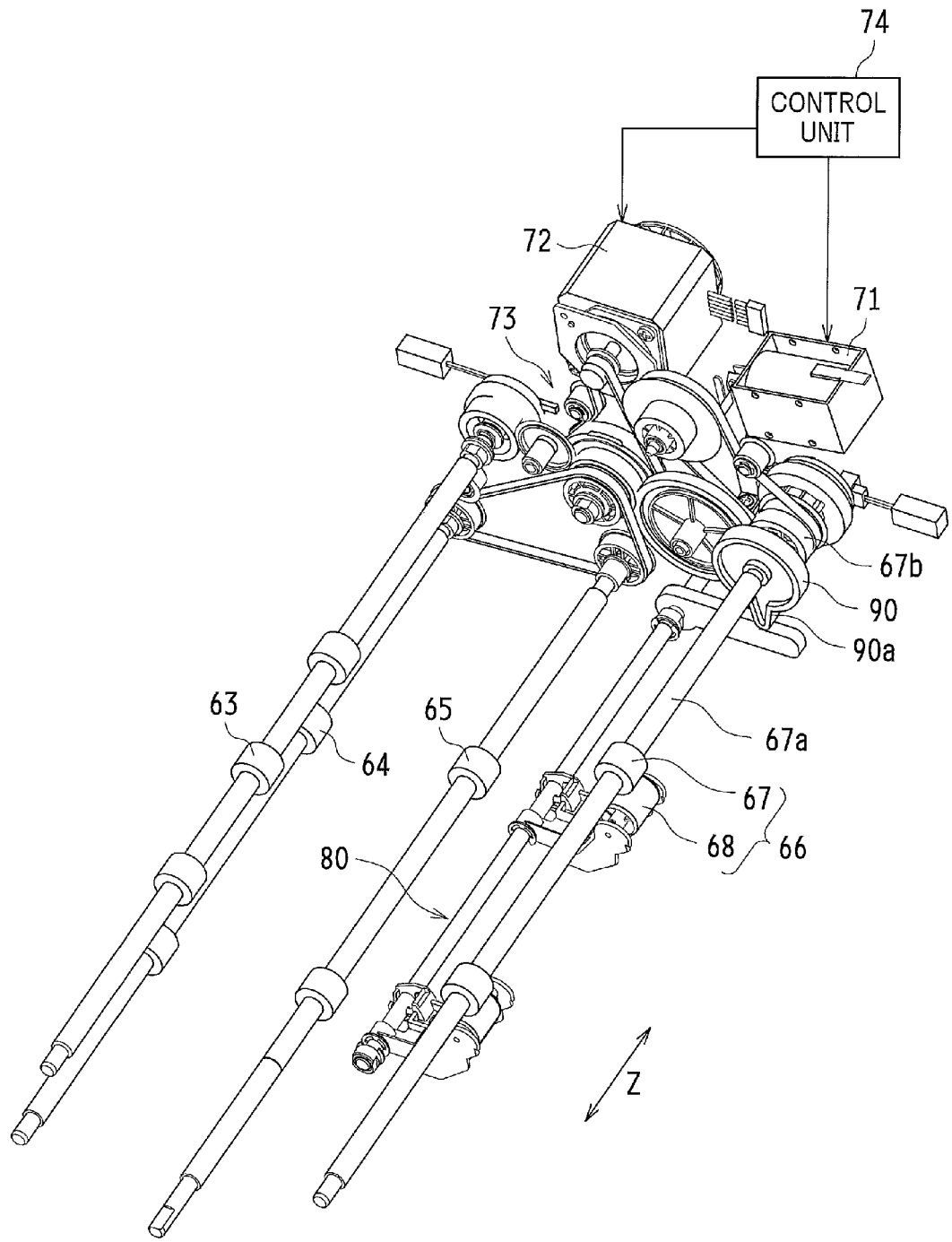
FIG. 3 is a perspective view illustrating in particular a drive mechanism of the original transport device according to a first embodiment of the present invention.

FIG. 3 is a perspective view illustrating in particular a drive mechanism of the original transport device according to the first embodiment of the present invention.

In the original transport device 50 according to the first embodiment of the present invention, the drive mechanism transmits power of a power unit 72 to a plurality of rollers via a transmission member 73 so that the rollers are driven to rotate. Specifically, the power unit 72 is, for example, a motor. The transmission member 73 has a configuration in which a plurality of gears and belts and the like are combined. The respective rotational shafts of the registration roller 63, the pre-reading roller 64, the post-reading roller 65 and the fixing roller 67 are connected to the transmission member 73, accordingly, they are driven to rotate by the power of the power unit 72. The separate/contact roller 68 is supported by a swinging support member 80. An operation unit 71 is coupled to the swinging support member 80. Note that the paper discharge rollers 66, the swinging support member 80 and the operation unit 71 will be described later in detail referring to FIGS. 4 to 6.

In FIG. 3, the registration roller 63, the pre reading roller 64 and the post-reading roller 65 are each shown as one roller of the pair, the one that is driven to rotate by the power unit 72. That is, the other rollers driven by the respective one rollers are omitted. Also, respective shafts for driving and rotating the pickup roller 61 and the feed roller 62 may be connected to the transmission member 73. In this embodiment, the transmission member 73 is connected to one end of a fixing shaft 67a of the fixing roller 67. Hereinafter, for the sake of description, the direction parallel to the fixing shaft 67a is referred to as a shaft direction Z. Also, in the shaft direction Z, the side to which the transmission member 73 is connected is occasionally referred to as a rear side, and the side to which the transmission member 73 is not connected is occasionally referred to as a front side. FIG. 3 is a perspective view that is viewed from the upper front side. In this specification, side views and cross-sectional views are viewed from the front side, unless otherwise mentioned.

The power unit 72 is controlled by a control unit 74 and is driven forward or backward according to instructions from the control unit 74. The control unit 74 is, for example, a CPU for controlling the operation of the image forming apparatus 100. The control unit 74 controls the separate state or the press-contact state of the paper discharge rollers 66 by controlling, for example, ON/OFF of the operation unit 71. Furthermore, the control unit 74 determines whether a paper jam has occurred or not in the original transport path 53 according to a detection result of the original detection sensor 57. Note that a clutch and the like may be provided in the transmission member 73 so that, for example, the registration roller 63, the pre-reading roller 64 and the post reading rollers 65 are driven to rotate in one direction regardless of the drive direction of the power unit 72.

Figure 4:
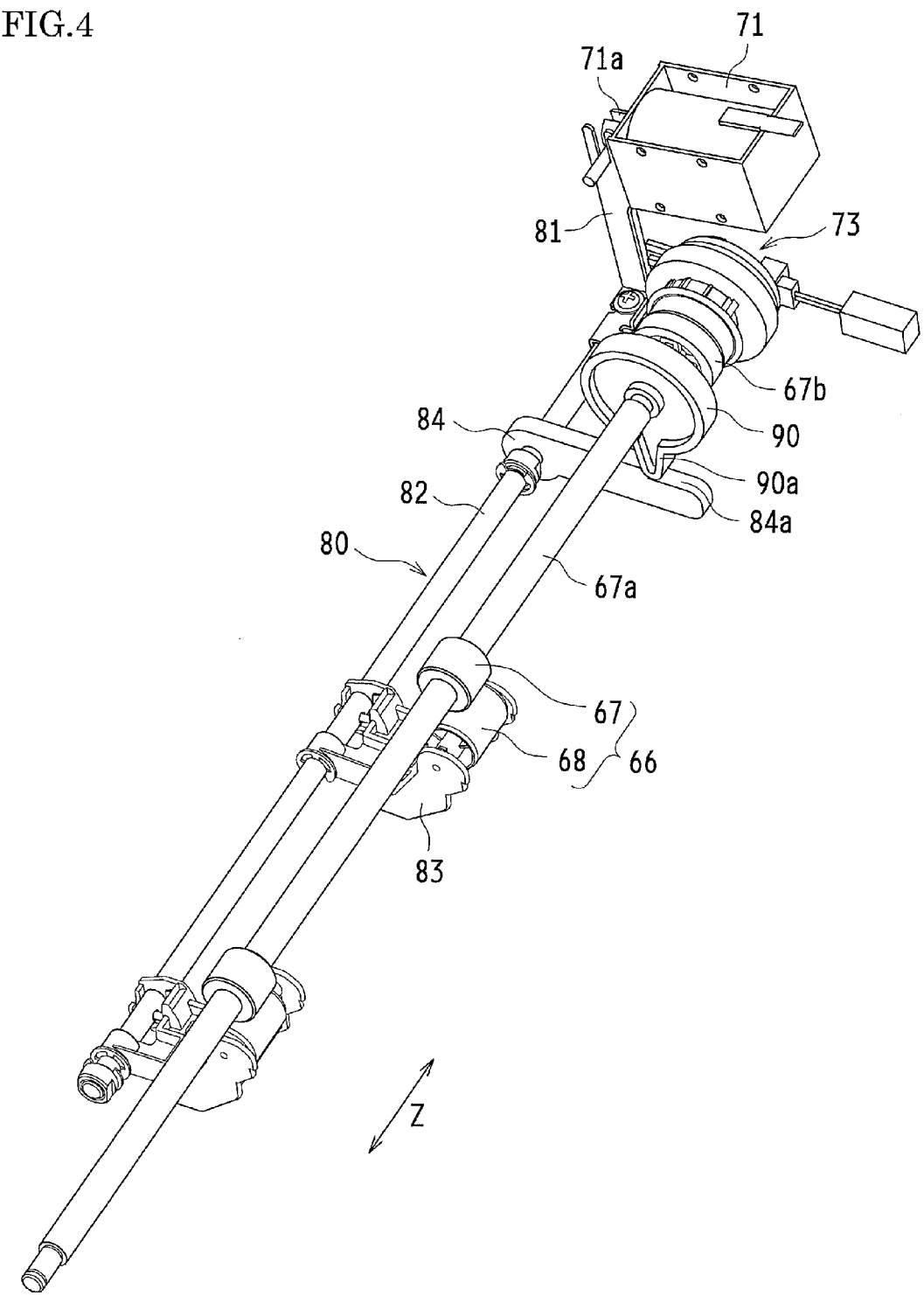
FIG. 4 is a perspective view of a substantial part illustrating in particular a vicinity of paper discharge rollers viewed from an upper front side.
Figure 5:
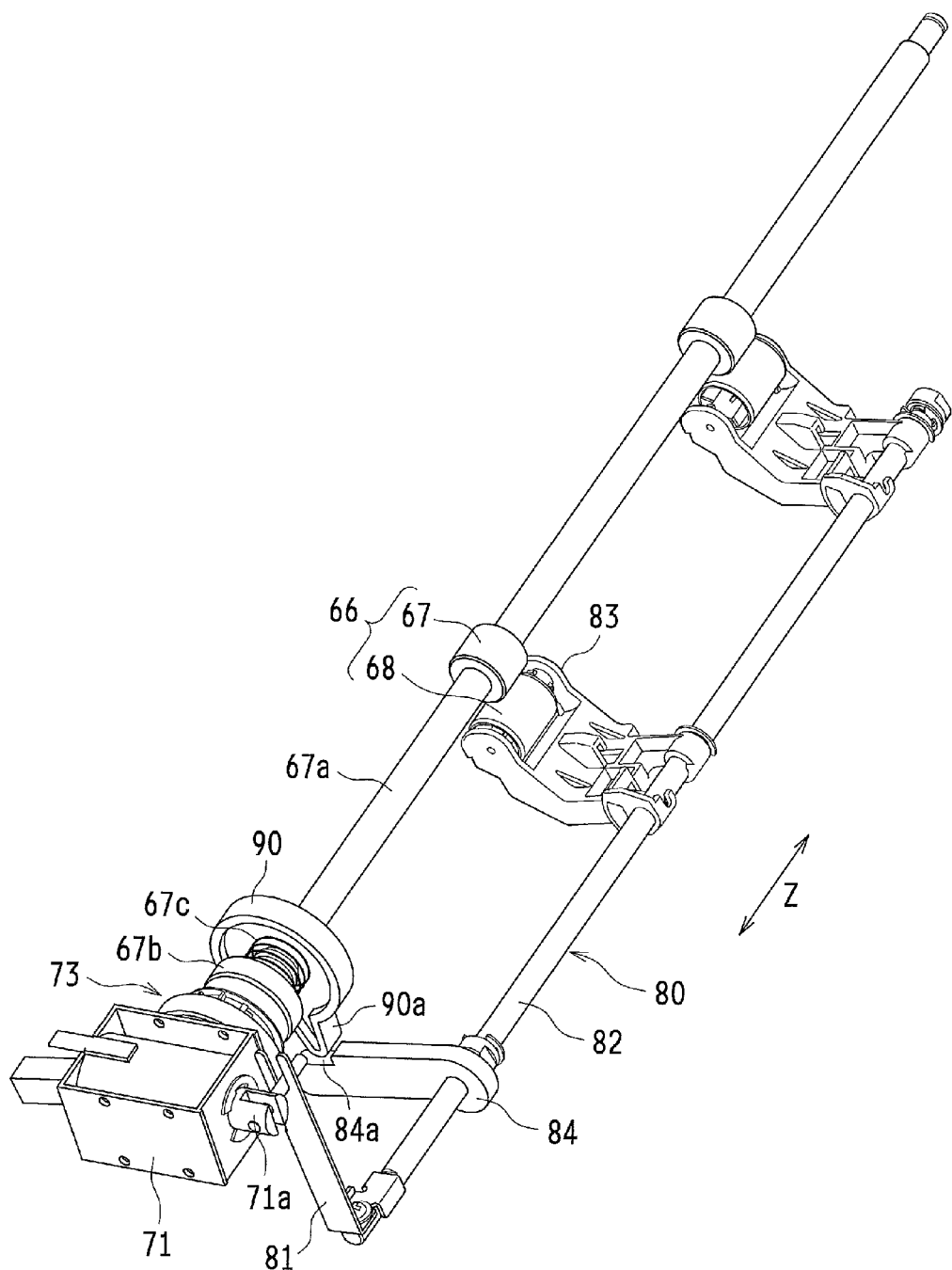
FIG. 5 is a perspective view of the substantial part illustrating in particular the vicinity of the paper discharge rollers viewed from an upper rear side.
Figure 6:
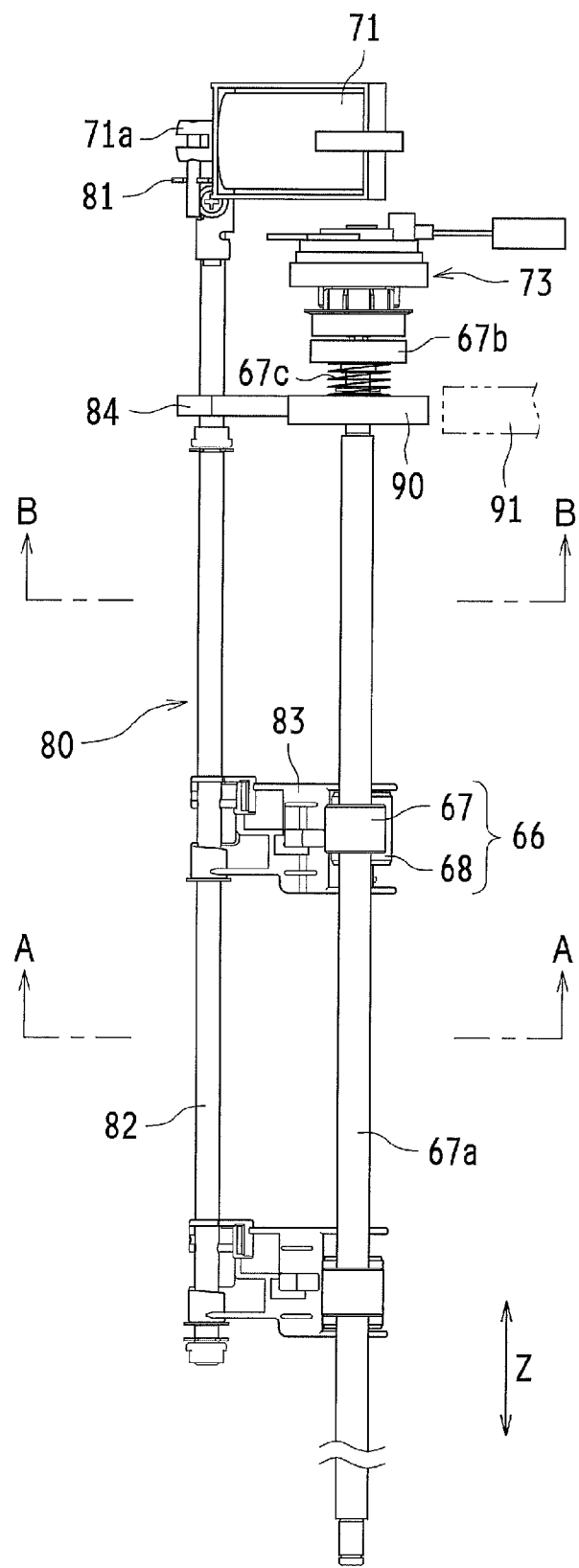
FIG. 6 is a top view of the substantial part illustrating in particular the vicinity of the paper discharge rollers.

FIG. 4 is a perspective view of a substantial part illustrating in particular a vicinity of the paper discharge rollers viewed from the upper front side. FIG. 5 is a perspective view of the substantial part illustrating in particular the vicinity of the paper discharge rollers viewed from the upper rear side. FIG. 6 is a top view of the substantial part illustrating in particular the vicinity of the paper discharge rollers.

The fixing shaft 67a of the fixing roller 67 is provided with a locking member 90, a fixing gear 67b and a fixing spring 67c on the end of its rear side. The locking member 90 is rotatably supported by the fixing shaft 67a, and a part of the locking member 90, which protrudes toward the direction separated from the fixing shaft 67a, is a locking portion 90a. The locking member 90 is supported so as to not move in the shaft direction Z. The fixing gear 67b is a gear corresponding to a part of the transmission member 73, and is fixed to the fixing shaft 67a. That is, the power of the power unit 72 is transmitted to the fixing shaft 67a via the fixing gear 67b. The fixing spring 67c is a spring that is wound around the fixing shaft 67a. The one end of the fixing spring 67c is fixed to the fixing gear 67b, and the other end makes contact with the locking member 90.

Figure 8A:
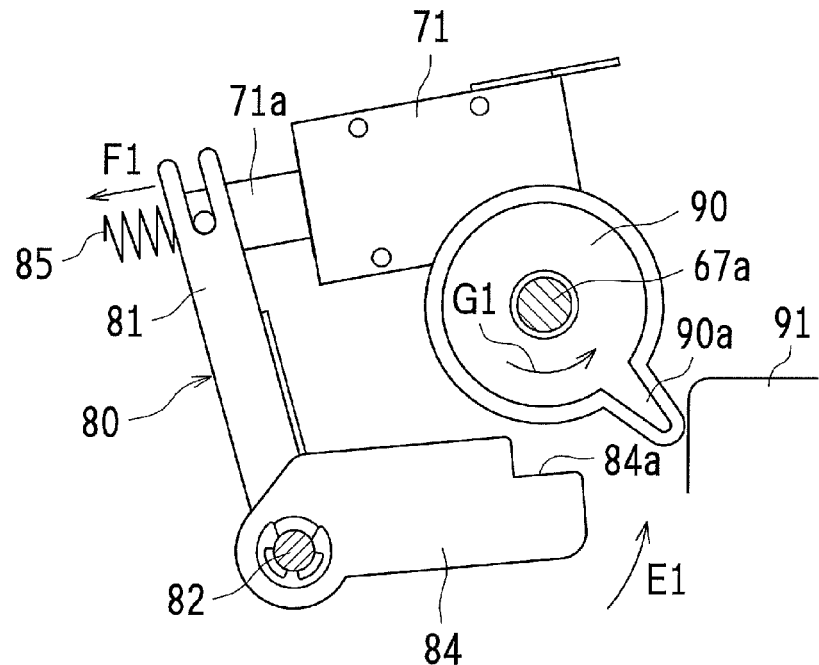
FIG. 8A is a cross-sectional view illustrating a state in which a locking member is located in a releasing position and the operation unit is turned off in the original transport device according to the first embodiment of the present invention.

When the fixing shaft 67a rotates, the fixing spring 67c rotates accompanied by the rotation of the fixing gear 67b, which generates friction between the fixing spring 67c and the locking member 90. As a result, the locking member 90 also rotates in conjunction with the fixing shaft 67a due to the frictional force applied thereto. A rotation restriction portion 91 (see FIG. 6) is disposed in a position overlapped with the locking member 90 in the shaft direction Z. As shown in FIG. 8A described later, the rotation restriction portion 91 receives the locking portion 90a that moves by the forward rotation. When the locking portion 90a makes contact with the rotation restriction portion 91, the rotation of the locking member 90 is stopped, thus, the fixing shaft 67a idles relative to the locking member 90. Also, as shown FIG. 8C described later, when the locking member 90 rotates backward, the locking portion 90a makes contact with the swinging support member 80 (the swinging contact portion 84a). The operation of the locking member 90 will be described later in detail referring to FIGS. 8A to 8D.

The operation unit 71 is driven by the solenoid. By switching ON (drive)/OFF (stop), a coupling member 71a disposed on one end of the operation unit 71 is taken in/out (lengthened/shortened).

The swinging support member 80 supports the separate/contact roller 68 and swings so that the separate/contact roller 68 is separated from/contacted with the fixing roller 67. Specifically, the swinging support member 80 is mainly constituted by a swinging coupling member 81, a swing support shaft 82, a roller support member 83 and a swinging locking member 84. The swinging coupling member 81, the roller support member 83 and the swinging locking member 84 are integrally formed with the swing support shaft 82. The swinging support member 80 swings (rotates) about the swing support shaft 82, thereby, the separate/contact roller 68 is separated from/contacted with the fixing roller 67.

A one end (the lower end in FIG. 4) of the swinging coupling member 81 is fixed to the swing support shaft 82. The other end (the upper end in FIG. 4) is coupled to the coupling member 71a. The swing support shaft 82 is a shaft parallel to the shaft direction Z, the ends of which are rotatably supported by the original transport device 50. The roller support member 83 is extended from the swing support shaft 82 toward the side of the fixing roller 67. The separate/contact roller 68, which is provided in the tip of the roller support member 83, is rotatably supported by the roller support member 83. The swinging locking member 84 is disposed in the position overlapped with the locking member 90 in the shaft direction Z. The swinging locking member 84 is extended from the swing support shaft 82 below the locking member 90. An upper end portion of the swinging locking member 84 is cut out so as to form a swinging contact portion 84a. The paper discharge rollers 66 and the operation unit 71 are disposed on the same side (the right side in FIG. 6) relative to the swing support shaft 82 (on the left side in FIG. 6).

The positional relationship or shapes of the swinging support member 80 and the operation unit 71 may suitably designed so that the paper discharge rollers 66 make press-contact with each other when the operation unit 71 is turned on.

Figure 7A:
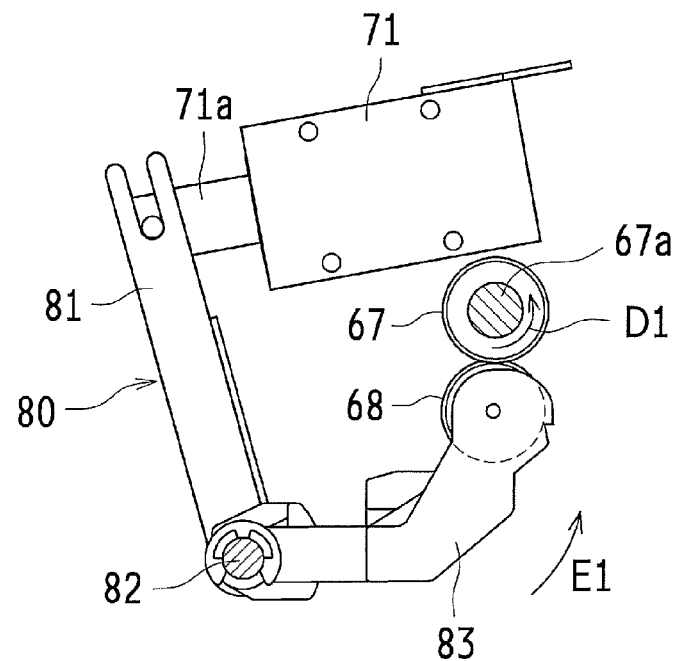
FIG. 7A is a cross-sectional view illustrating in particular the paper discharge rollers in a press-contact state and an operation unit.
Figure 7B:
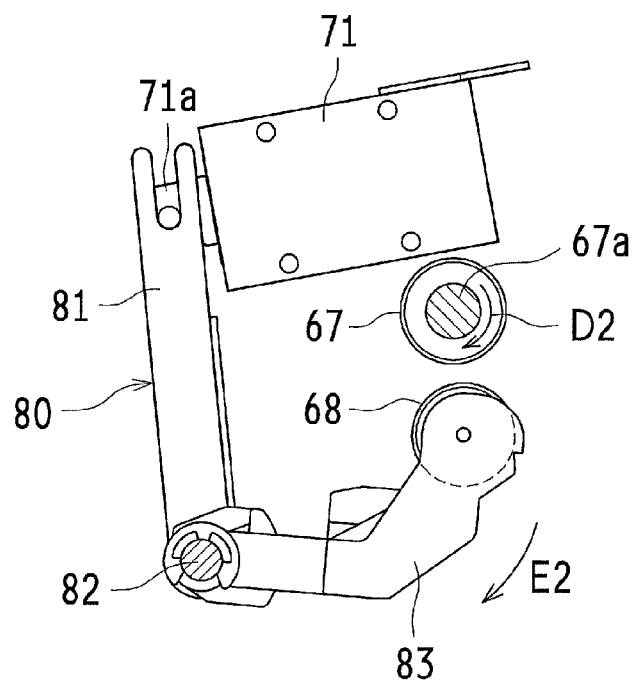
FIG. 7B is a cross-sectional view illustrating in particular the paper discharge rollers in a separate state and the operation unit.

Next, the relationship between the swinging support member 80 and the separate/press-contact state of the paper discharge rollers 66 will be described with reference to FIGS. 7A and 7B. FIGS. 7A and 7B each show a cross-section taken from line A-A in FIG. 6, for mainly illustrating the paper discharge rollers 66 and the roller support member 83. Thus, in consideration of visibility of the figures, the elements such as the locking member 90 and the swinging locking member 84 are omitted.

FIG. 7A is a cross-sectional view illustrating in particular the paper discharge rollers in the press-contact state and an operation unit.

In the state illustrated in FIG. 7A, the separate/contact roller 68 is press-contacted to the fixing roller 67. Here, the coupling member 71a protrudes from the operation unit 71 and the swinging coupling member 81 is pressed in the direction separated from the operation unit 71. As a result, the roller support member 83 swings toward a press-contacting direction E1 (the upper direction in FIG. 7A) in which the separate/contact roller 68 is press-contacted to the fixing roller 67, where the roller support member 83 is stopped. The fixing roller 67 rotates forward in the direction indicated by an arrow D1 so as to discharge the original to the discharge tray 52. Hereinafter, for the sake of description, the position of the swinging support member 80 coming close to the fixing roller 67 is occasionally referred to as a press-contact position.

FIG. 7B is a cross-sectional view illustrating in particular the paper discharge rollers in the separate state and the operation unit.

In the state illustrated in FIG. 7B, the separate/contact roller 68 is separated from the fixing roller 67. Here, the coupling member 71a is housed in the operation unit 71 and the swinging coupling member 81 is pulled toward the direction coming close to the operation unit 71. As a result, the roller support member 83 swings toward a separating direction E2 (the lower direction in FIG. 7B) in which the separate/contact roller 68 is separated from the fixing roller 67, where the roller support member 83 is stopped. The fixing roller 67 rotates backward in the direction indicated by an arrow D2 so as to return the original to the original transport path 53. Hereinafter, for the sake of description, the position of the swinging support member 80 separating from the fixing shaft 67a is occasionally referred to as a separate position.

The fixing roller 67 rotates forward in FIG. 7A and rotates backward in FIG. 7B. However, the present invention is not limited thereto. It is possible to desirably select the forward/backward rotation of the fixing roller 67 regardless of the separate/press-contact state of the paper discharge rollers 66.

As described above, in this embodiment, the swinging support member 80 swings due to the operation unit 71 and is shifted repeatedly to the state shown in FIG. 7A and to the state shown in FIG. 7B. Here, the locking member 90 makes contact with the swinging support member 80 to restrict the swing of the swinging support member 80. Next, an operation of the locking member 90 to lock the swinging support member 80 will be described with reference to FIGS. 8A to 8D. FIGS. 8A to 8D each show a cross-section taken from line B-B in FIG. 6, for mainly illustrating the locking member 90 and the swinging locking member 84.

FIG. 8A is a cross-sectional view illustrating the state in which the locking member is located in a releasing position and the operation unit is turned off in the original transport device according to the first embodiment of the present invention.

In the first embodiment, when the operation unit 71 is in the off state, the coupling member 71a is in the protruding state. In particular, when the operation unit 71 is in the off state, no load is applied to the coupling member 71a. Thus, the coupling member 71a is easily lengthened/shortened by receiving a force from the outside. A biasing member 85 is attached to the swinging coupling member 81. The biasing member 85 biases the swinging coupling member 81 in the direction opposite to a force (an operating force F2 shown in FIG. 8B described later) applied to the swinging coupling member 81 by the operation unit 71. That is, the biasing member 85 applies a biasing force F1 to the swinging coupling member 81 in the direction separating from the operation unit 71 (the left side in FIG. 8A) so as to take out the coupling member 71a. The swinging support member 80, which is biased by the biasing member 85, swings toward the press-contacting direction E1 and is stopped. As a result, the swinging locking member 84 and the roller support member 83 come close to the fixing shaft 67a, which corresponds to the state in which the paper discharge rollers 66 are press-contacted to each other in FIG. 7A. That is, the swinging locking member 84 (the swinging support member 80) is located in the above-described press-contact position.

The locking member 90 rotates in the direction indicated by an arrow G1 according to the forward rotation of the fixing shaft 67a, and is stopped in the state in which the locking portion 90a makes contact with the rotation restriction portion 91. In this state, the locking member 90 (in particular, the locking portion 90a) is separated from the swinging support member 80 (in particular, the swinging contact portion 84a). Hereinafter, for the sake of description, the position of the locking member 90 where the locking portion 90a makes contact with the rotation restriction portion 91 so as to be stopped is occasionally referred to as a releasing position.

In this embodiment, the swinging support member 80 swings toward the press-contacting direction E1 due to the biasing member 85. However, the present invention is not limited thereto. It is possible to not provide the biasing member 85 so that the swinging support member 80 swings, due to its own weight, toward the press-contacting direction E1.

Figure 8B:
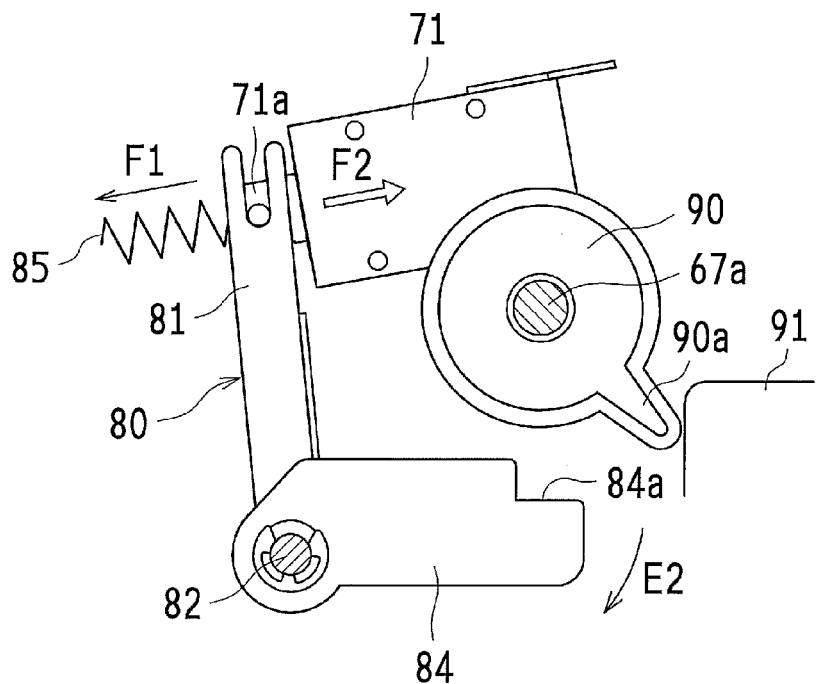
FIG. 8B is a cross-sectional view illustrating a state in which the locking member is located in the releasing position and the operation unit is turned on in the original transport device according to the first embodiment of the present invention.

FIG. 8B is a cross-sectional view illustrating the state in which the locking member is located in the releasing position and the operation unit is turned on in the original transport device according to the first embodiment of the present invention.

In FIG. 8B, the operation unit 71 is turned on from the state shown in FIG. 8A. When the operation unit 71 is turned on, the operating force F2 in the direction opposite to the biasing force F1 is applied to the coupling member 71a. Compared with the biasing force F1, the operating force F2 is sufficiently strong. Thus, the operating force F2 overcomes the biasing force F1 to attract the coupling member 71a. As a result, the swinging coupling member 81 is pulled toward the direction coming close to the operation unit 71 (the right side in FIG. 8). The swinging support member 80 swings toward the separating direction E2 and is stopped. Here, the swinging locking member 84 and the roller support member 83 are separated from the fixing shaft 67a, which corresponds to the state in which the paper discharge rollers 66 are separated from each other in FIG. 7B. That is, the swinging locking member 84 (the swinging support member 80) is located in the above-described separate position.

Regarding the locking member 90, it is sufficient to be stopped in the releasing position. Thus, the fixing shaft 67a may rotate forward continually or may be stopped.

Figure 8C:
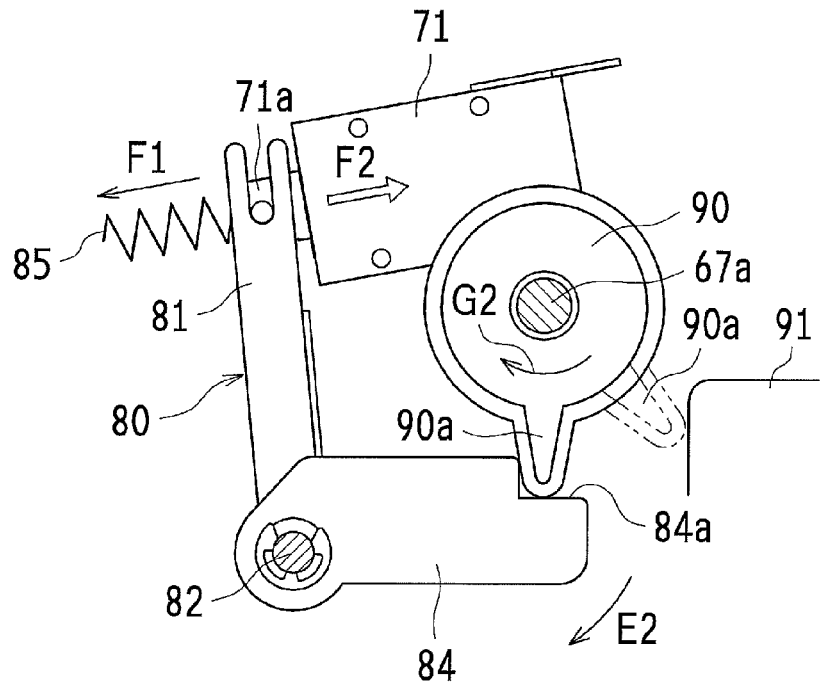
FIG. 8C is a cross-sectional view illustrating a state in which the locking member is located in a locking position and the operation unit is turned on in the original transport device according to the first embodiment of the present invention.

FIG. 8C is a cross-sectional view illustrating the state in which the locking member is located in a locking position and the operation unit is turned on in the original transport device according to the first embodiment of the present invention.

In FIG. 8C, the locking member 90 rotates in the direction indicated by an arrow G2 from the state shown in FIG. 8B. The dashed-two dotted line indicates the locking portion 90a before moving. Due to the backward rotation of the fixing shaft 67a, the locking member 90 rotates so that the locking portion 90a makes contact with the swinging contact portion 84a. As described above, when the locking portion 90a makes contact with any member, the fixing shaft 67a idles relative to the locking member 90, thus the rotation of the locking member 90 is stopped. Here, the locking portion 90a makes contact with the upper side of the swinging locking member 84 (the swinging contact portion 84a). Hereinafter, for the sake of description, the position of the locking member 90 where the locking portion 90a makes contact with the swinging contact portion 84a so as to be stopped is occasionally referred to as a locking position.

Since the operation unit 71 is in the on state, the swinging support member 80 is biased in the separating direction E2 and is being stopped in the separate position.

Figure 8D:
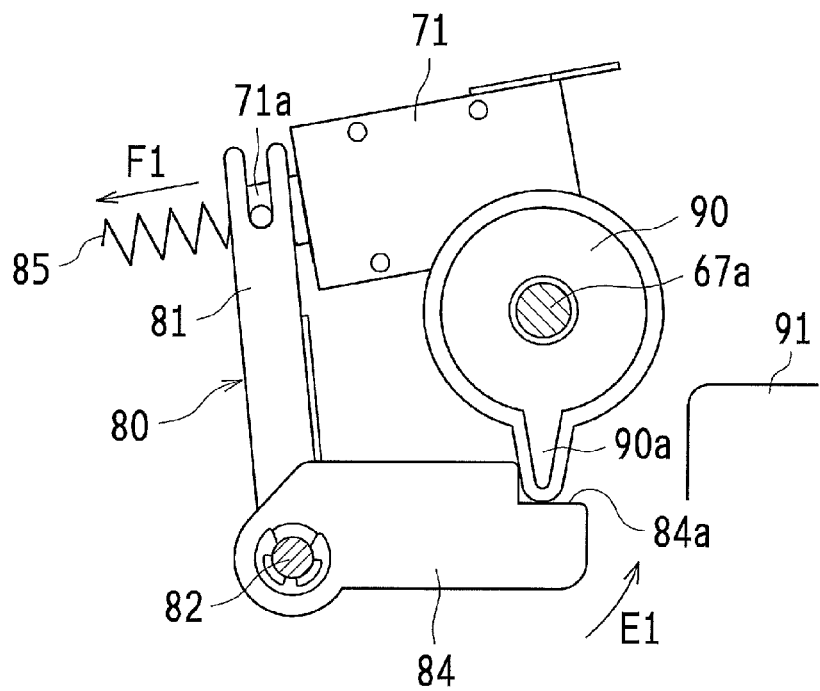
FIG. 8D is a cross-sectional view illustrating a state in which the locking member is located in the locking position and the operation unit is turned off in the original transport device according to the first embodiment of the present invention.

FIG. 8D is a cross-sectional view illustrating the state in which the locking member is located in the locking position and the operation unit is turned off in the original transport device according to the first embodiment of the present invention.

In FIG. 8D, the operation unit 71 is turned off from the state shown in FIG. 8C. When the operation unit 71 is turned off, the operating force F2 disappears, thus only the biasing force F1 is applied to the swinging support member 80. As a result, the swinging support member 80 is biased so as to swing toward the press-contacting direction E1. However, the locking member 90 exists in the direction in which the swinging locking member 84 swings (the upper direction), thus the swinging locking member 84 is stopped in the separate position without swinging. That is, although the swinging support member 80 intends to return to the press-contact position, the locking member 90 stopped in the locking position locks the swinging support member 80. Thus, the swing of the swinging support member 80 is restricted.

When the locking member 90 rotates in the direction indicated by the arrow G1 to move to releasing position from the state shown in FIG. 8D, the locking state of the swinging locking member 84 is released, and the swinging support member 80 moves to the press-contact position. Thus, the state returns to the state shown in FIG. 8A.

Figure 9:
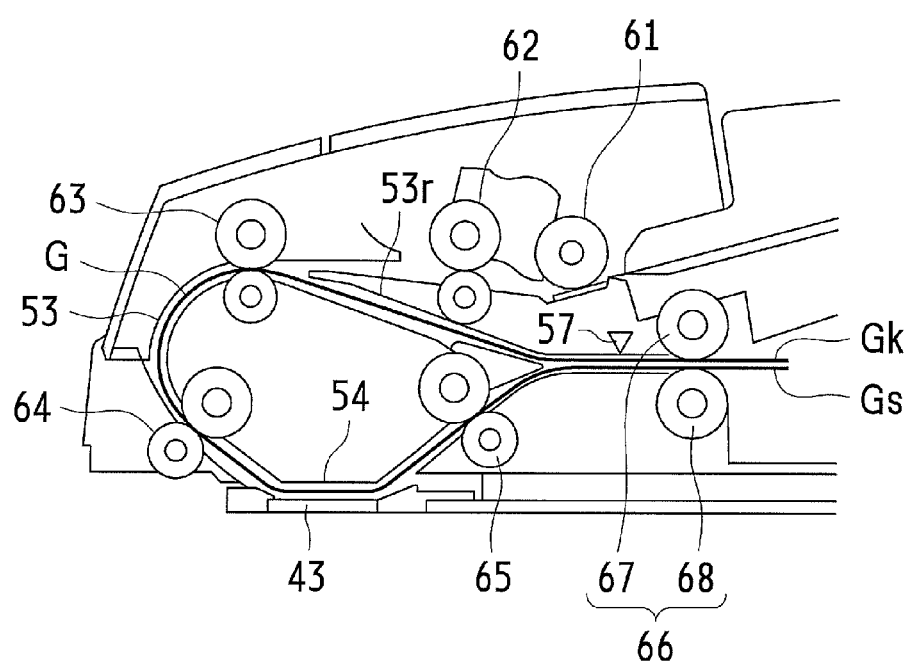

FIG. 9 is an enlarged side view illustrating the original passing by.

In this embodiment, after reading the surface of the original, sometimes the rear surface of the original is read by the backward rotation of the paper discharge rollers 66. FIG. 9 shows double side reading of a large-size original G to be read. In some cases, it is not possible to ensure a sufficient length of the original transport path 53 relative to the size of the original G. In such a case, while a leading end Gs of the original G has reached the paper discharge rollers 66 via the reverse transport path 53r, a back end Gk of the original G has not yet passed through the paper discharge rollers 66. If the paper discharge rollers 66 make press-contact with each other under this situation, the leading end Gs and the back end Gk of the original G are sandwiched together. Since the respect transport directions of the leading end Gs and the back end Gk are opposed to each other, the paper discharge rollers 66 should not transport them in one direction. Therefore, the paper discharge rollers 66 are separated from each other to release the original G, thereby the original G is transported by other rollers.

Next, a process for transporting the original by the original transport device 50 will be described. In this embodiment, an original transport process indicated in FIG. 10 and a paper jam detection process indicated in FIG. 11 are simultaneously performed. That is, when transporting the original, an unexpected condition may occur at any time. Therefore, whether the paper jam exists or not is monitored constantly.

Figure 10:
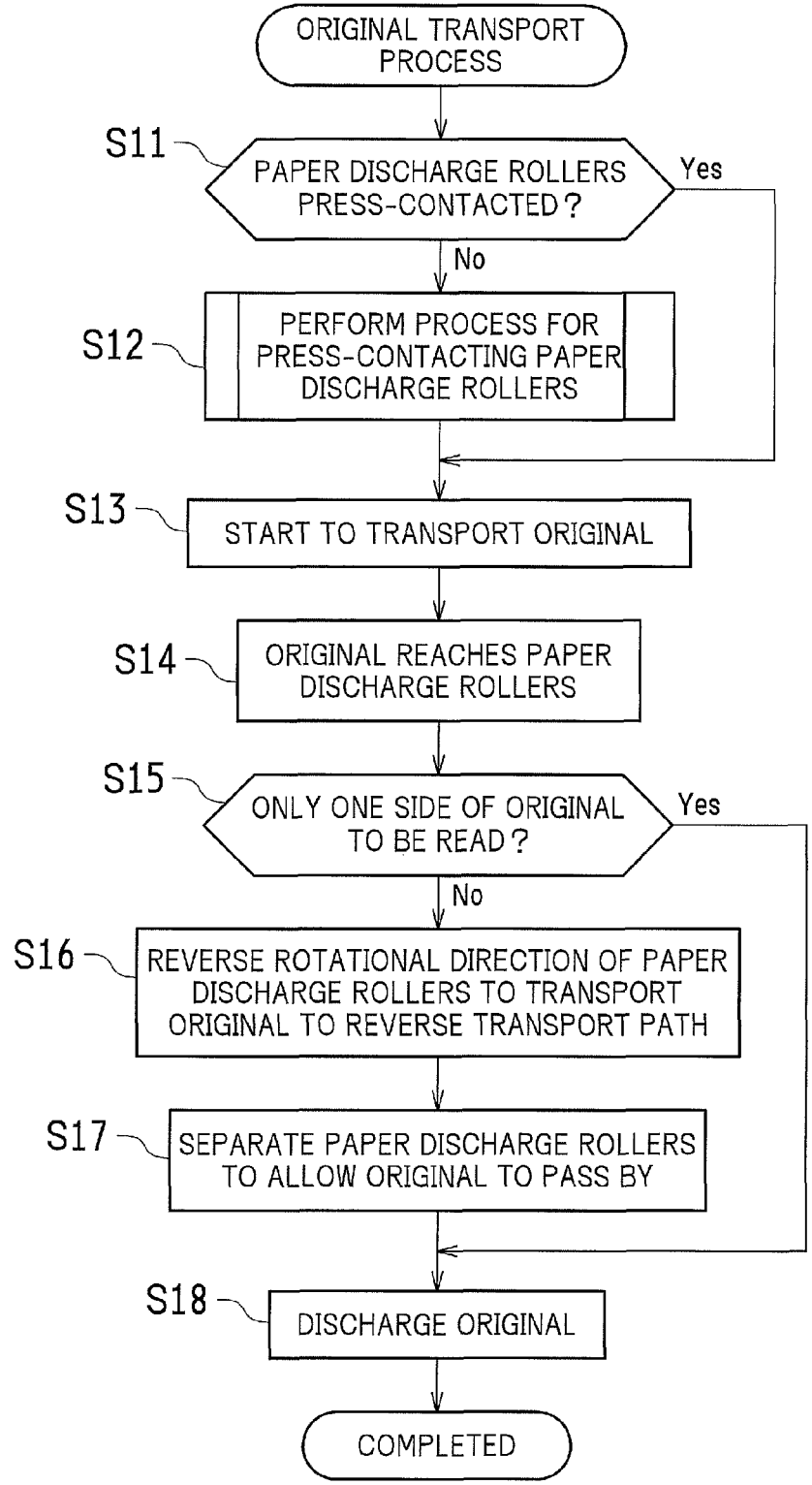
FIG. 10 is a process flow chart indicating an original transport process when the original is transported by the original transport device.
Figure 11:
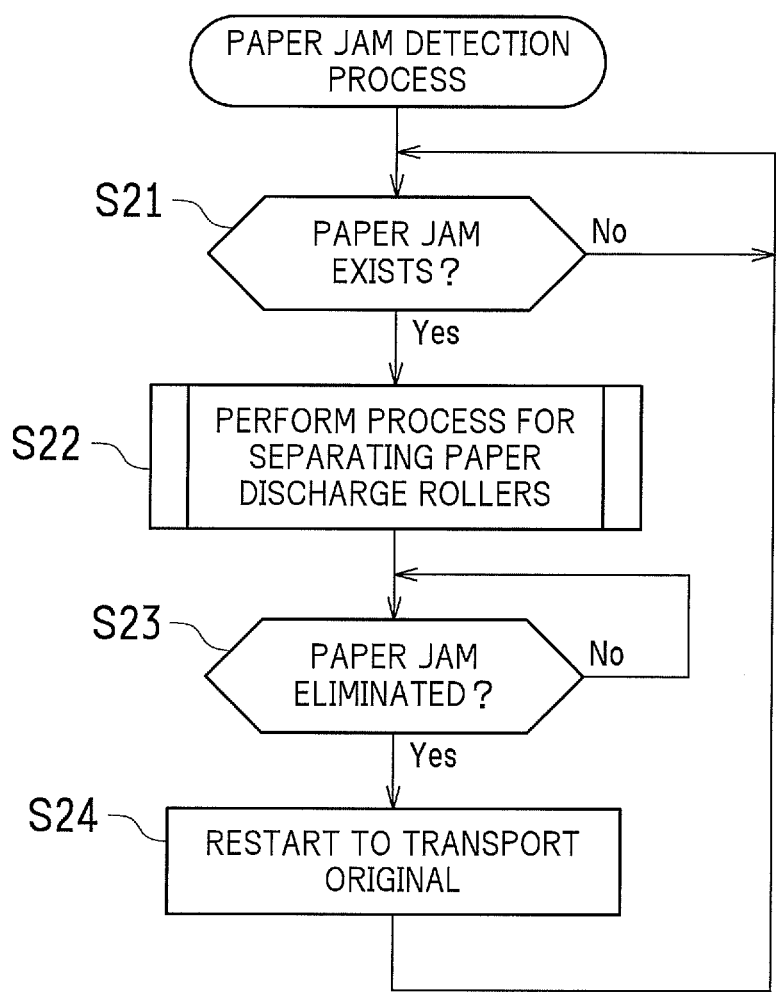
FIG. 11 is a process flow chart indicating a paper jam detection process when a paper jam is detected by the original transport device.

FIG. 10 is a process flow chart indicating the original transport process when the original is transported by the original transport device.

In step S11, it is determined by the control unit 74 whether the paper discharge rollers 66 are press-contacted to each other. If the paper discharge rollers 66 are press-contacted to each other (step S11: Yes), the process advances to step 13. On the other hand, if the paper discharge rollers 66 are not press-contacted to each other (step S11: No), the process advances to step S12.

Figure 13:
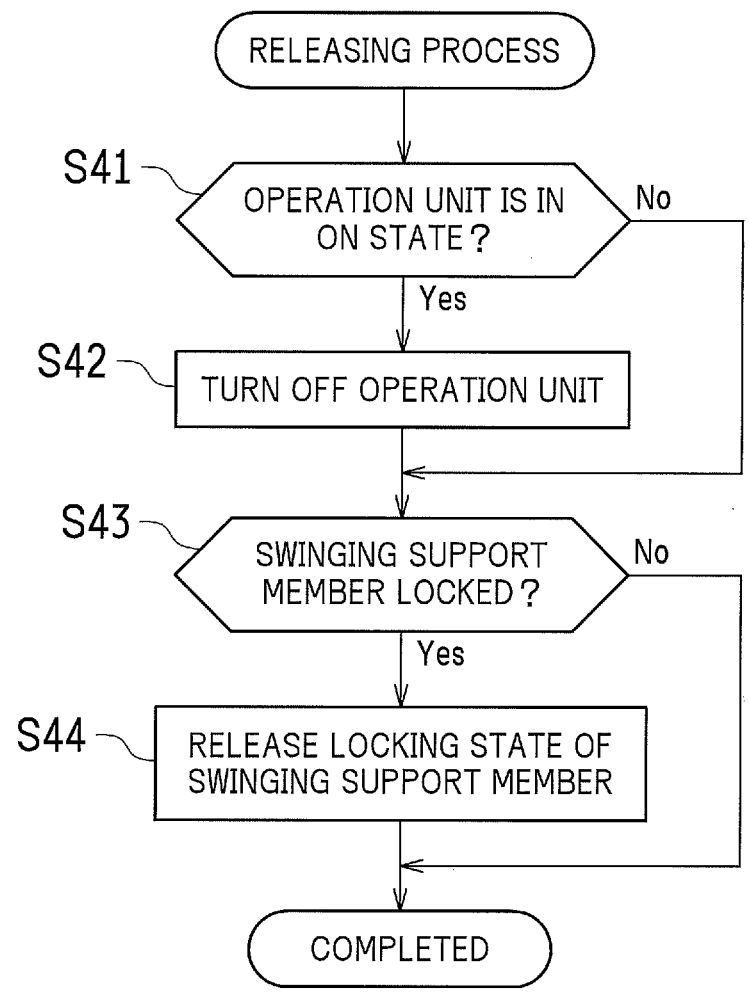
FIG. 13 is a process flow chart indicating a releasing process when the locked swinging support member is released.

In step S12, the process for press-contacting the paper discharge rollers 66 to each other is performed. In the first embodiment, a releasing process described later with FIG. 13 is performed. As a result, the paper discharge rollers 66 are press-contacted to each other shown in FIG. 7A, and the process advances to step S13.

In step S13, the transport of the original is started by feeding the original placed on the original tray 51 to the original transport path 53.

In step S14, an image on the original is read by the image reading device 41, and the transported original reaches the paper discharge rollers 66.

In step S15, it is determined by the control unit 74 whether only one side of the original should be read or not. If only one side of the original should be read (step S15: Yes), the process advances to step S18. On the other hand, if one side reading is not sufficient (step 15: No), i.e., if double side reading is required, the process advances to step S16.

In step S16, the rotational direction of the paper discharge rollers 66 is reversed to transport the original to the reverse transport path 53r. The side of the original is reversed and the original is returned to the original transport path 53 so that an image on the other side is read.

In step S17, the paper discharge rollers 66 are separated from each other so as to be in the state shown in FIG. 7B, thus, the original can pass by. Here, in the first embodiment, the operation unit 71 is turned on so as to be in the state shown in FIG. 8B, thus the paper discharge rollers 66 are separated from each other. However, the present invention is not limited thereto. The paper discharge rollers 66 may be separated from each other by the releasing process described later with FIG. 12.

In step S18, the original is discharged from the paper discharge rollers 66 to the discharge tray 52, thus the process is completed. If multiple originals are to be read, the process returns to step S11 so that the process is repeated. Also, if the operation unit 71 is in the on state when the transport of original is completed, the operation unit 71 is turned off so as to be in the stand-by state.

FIG. 11 is a process flow chart indicating the paper jam detection process when the paper jam is detected by the original transport device.

In step S21, it is determined by the control unit 74 whether the paper jam exists in the original transport path 53. If it is determined that the paper jam exists in the original transport path 53 (step S21: Yes), the process advances to step S22. On the other hand, if it is not determined that the paper jam exist in the original transport path 53 (step S21: No), the control unit 74 continues to monitor until any paper jam occurs. That is, when there is no paper jam, the original is transported continuously.

Figure 12:
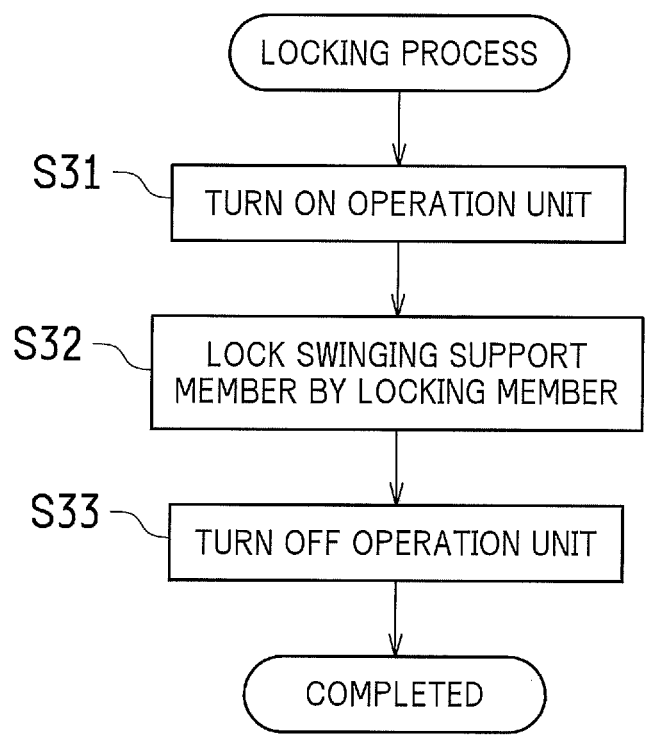
FIG. 12 is a process flow chart indicating a locking process when a swinging support member is locked by the locking member.

In step S22, the original transport process is temporarily stopped so as to perform the process for separating the paper discharge rollers 66 from each other. In the first embodiment, a locking process described later with FIG. 12 is performed. As a result, the paper discharge rollers 66 are separated from each other as shown in FIG. 7B, then the process advances to step S23.

In step S23, it is determined by the control unit 74 whether the paper jam has been eliminated or not. Here, an action of a user such as removing the jammed sheet is waited. As a result, if the paper jam is eliminated (step S23: Yes), the process advances to step S24. On the other hand, if the paper jam is not eliminated (step S23: No), the original transport device 50 is in the stand-by state until the paper jam is eliminated.

In step S24, the transport of the original is restarted by the control unit 74 and the process returns to step S21, thus the process is repeated. The paper jam detection process may be completed along with the completion of the original transport process.

FIG. 12 is a process flow chart indicating the locking process when the swinging support member is locked by the locking member.

In the first embodiment, the locking process is performed so that the press-contacted paper discharge rollers 66 are separated from each other. That is, when the process is started, its state corresponds to the state shown in FIG. 8A.

In step S31, the operation unit 71 is turned on. As a result, the swinging support member 80 swings toward the separating direction E2, which corresponds to the state shown in FIG. 8B.

In step S32, the swinging support member 80 is locked by the locking member 90. Specifically, the locking member 90 moves to the locking position due to the backward rotation of the fixing shaft 67a, which corresponds to the state shown in FIG. 8C.

In step S33, the operation unit 71 is turned off and the process is completed to maintain the state in which the paper discharge rollers 66 are separated from each other by locking the swinging support member 80 using the locking member 90, which corresponds to the state shown in FIG. 8D.

FIG. 13 is a process flow chart indicating the releasing process when the locked swinging support member is released.

In the first embodiment, the releasing process is performed so that the separated paper discharge rollers 66 are press-contacted to each other. That is, when the process is started, its state corresponds to the states shown in FIGS. 8B to 8D.

In step S41, it is determined by the control unit 74 whether the operation unit 71 is in the on state or not. If the operation unit 71 is in the on state (step S41: Yes), the process advances to the step S42. In this case, the state corresponds to the state shown in FIG. 8B or 8C. On the other hand, if the operation unit 71 is not in the on state (step S41: No), the process advances to step S43. In this case, the state corresponds to the state shown in FIG. 8D.

In step S42, the operation unit 71 is turned off. That is, in the case shown in FIG. 8B, the locking member 90 is located in the releasing position, thus the swinging support member 80 swings toward the press-contact position and the state turns to the state shown in FIG. 8A. In the case shown in FIG. 8C, the locking member 90 is located in the locking position, thus the swinging support member 80 does not swing and the state turns to the state shown in FIG. 8D.

In step S43, it is determined by the control unit 74 whether the swinging support member 80 is locked or not. If the swinging support member 80 is locked (step S43: Yes), the process advances to step S44. In this case, the state corresponds to the state shown in FIG. 8D. On the other hand, if the swinging support member 80 is not locked (step S43: No), the process is completed.

In step S44, the locking member 90 is driven so as to release the locking state of the swinging support member 80, thus the process is completed. That is, the swinging support member 80 swings toward the press-contact position due to the movement of the locking member 90 from the locking position to the releasing position. Thus, the state turns to the state shown in FIG. A.

As described above, the locking member 90 locks the swinging support member 80 while the operation unit 71 is in the on state so that the paper discharge rollers 66 are separated from each other or press-contacted to each other. After the operation unit 71 is turned off, the above separate/press-contact state of the paper discharge rollers 66 in the on state of the operation unit 71 is maintained. That is, by locking the swinging support member 80 using the locking member 90, it is possible to maintain the separate/press-contact state of the paper discharge rollers 66 when the operation unit 71 is in the off state. As a result, it is possible to reduce the operation time of the operation unit 71, which results in energy saving.

Also, in this embodiment, the swinging support member 80 swings toward the direction (the press-contacting direction E1) in which the paper discharge rollers 66 are press-contacted to each other when the operation unit 71 is in the off state. Also, the swinging support member 80 swings toward the direction (the separating direction E2) in which the paper discharge rollers 66 are separated from each other when the operation unit 71 is in the on state. The locking member 90 maintains the paper discharge rollers 66 in the separate state. Conventionally, a configuration has been adopted, the configuration in which the operation unit 71 is turned off in the stand-by state so that the paper discharge rollers 66 are separated from each other, and the operation unit 71 is turned on when the original is transported. In this case, it is necessary to operate the operation unit 71 without exception when the original is transported, which generates operating noise of the operation unit 71. In contrast, since the paper discharge rollers 66 are press-contacted to each other when the operation unit 71 is in the off state, it is possible to transport the original without operating the operation unit 71, which avoids generation of the operating noise.

It is preferable that the operation unit 71 is driven by the solenoid and that when the operation unit 71 is turned on, it biases the swinging support member 80 to one direction and when it is turned off, it applies no load to the swinging support member 80. With this configuration, the operation unit 71 easily performs control with its simple configuration. Also, since no load is applied when the operation unit 71 is turned off, even a weak force can easily control the position of the swinging support member 80.

Also, it is preferable that the biasing member 85 is provided, the biasing member 85 being coupled to the swinging support member 80 so as to bias the swinging support member 80 in the direction opposite to the direction in which the operation unit 71 biases the swinging support member 80. That is, with the combination of the operation unit 71 and the biasing member 85, it is possible that the separate/contact roller 68 easily separates from/makes contact with the fixing roller 67 repeatedly. Also, due to the biasing member 85, when the locking member 90 releases the locking state of the swinging support member 80, the separate/contact roller 68 can return to the state before it separates from/makes contact with the fixing roller 67 without operation of the operation unit 71. Furthermore, since the biasing member 85, which needs no power source, is provided, it is possible to swing the swinging support member 80 without supplying power source.

Also, in the original transport device 50, it is preferable that the paper jam in the original transport path 53 is determined based on the position of the original detected by the original detection sensor 57 so that the paper discharge rollers 66 are separated from each other. That is, when the paper jam occurs, since the paper discharge rollers 66 are separated from each other and the sandwiching of the original is released, the user can easily collect the original. Here, the locking member 90 is configured to maintain the separate state of the paper discharge rollers 66, thus it is possible that the operation unit 71 can be on stand-by in its off state.

Also, it is preferable that the locking member 90 moves between the locking position for locking the swinging support member 80 and the releasing position separated from the swinging support member 80 accompanied by the rotation of the fixing roller 67. That is, the locking member 90 can be moved by the power of the power unit 72, thus no power source for locking member 90 is needed.

Second Embodiment

Next, the original transport device 50 according to the second embodiment of the present invention will be described with reference to the drawings. The configuration of the second embodiment is substantially the same as that of the first embodiment except for the power for the locking member 90. Therefore, only the drawings illustrating in particular the locking member 90 and the swinging support member 80 are shown, and other drawings are omitted.

Figure 14A:
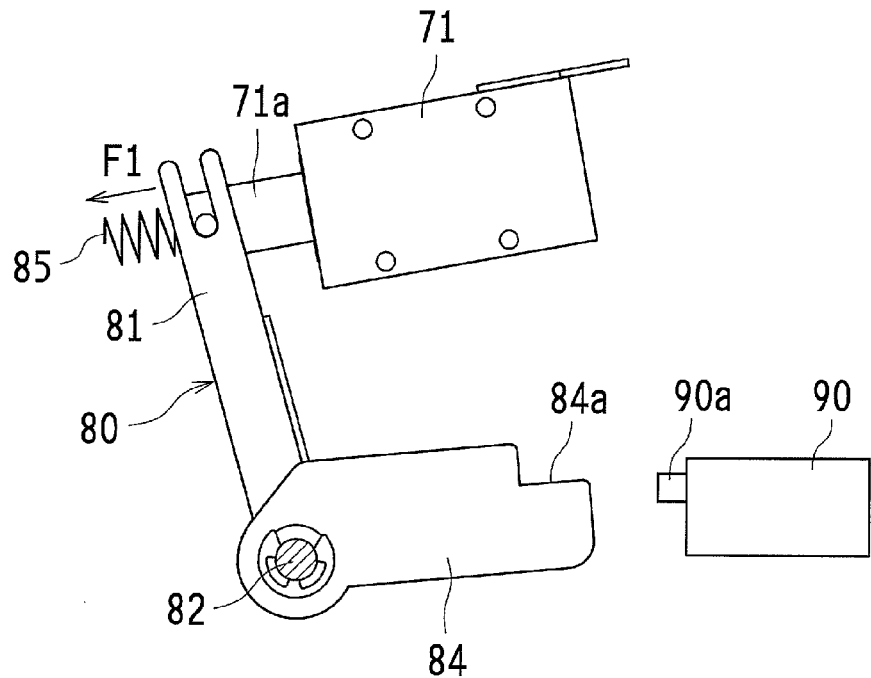
FIG. 14A is a cross-sectional view illustrating in particular a substantial part of the original transport device according to a second embodiment of the present invention.
Figure 14B:
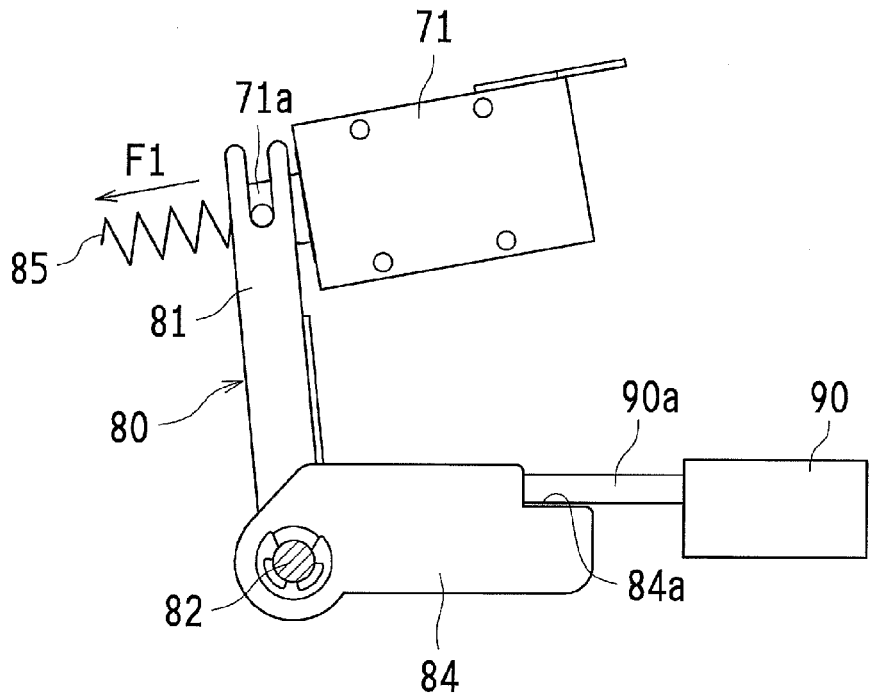
FIG. 14B is a cross-sectional view illustrating the swinging support member locked by the locking member in the original transport device according to the second embodiment of the present invention.

FIG. 14A is a cross-sectional view illustrating in particular a substantial part of the original transport device according to the second embodiment of the present invention. FIG. 14B is a cross-sectional view illustrating the swinging support member locked by the locking member in the original transport device according to the second embodiment of the present invention. Note that the elements having substantially the same functions as those of the first embodiment will be indicated by the same reference numerals, whose description will be omitted.

FIGS. 14A and 14B each show substantially the same part as the cross-section taken from line B-B in FIG. 6. In the second embodiment, the locking member 90 is operated by the different power from that of the power unit 72 so as to take in/out the locking portion 90*a*. In FIG. 14A, the locking member 90 (the locking portion 90*a*) is located in the releasing position, which corresponds to the state shown in FIG. 8A. In FIG. 14B, the locking member 90 (the locking portion 90*a*) is located in the locking position, which corresponds to the state shown in FIG. 8D. That is, the protruding locking portion 90*a* makes contact with the swinging contact portion 84*a* so as to stop the swing of the swinging support member 80 and to lock it, so that the swinging support member 80 is located in the separate position.

Third Embodiment

Next, the original transport device 50 according to the third embodiment of the present invention will be described with reference to the drawings. The configuration of the third embodiment is substantially the same as that of the first embodiment except for the position of the locking member 90 and the shape of the swinging locking member 84. Therefore, only the drawings illustrating in particular the locking member 90 and the swinging support member 80 are shown, and other drawings are omitted. FIGS. 15A to 15D each show substantially the same part as the cross-section taken from line B-B in FIG. 6. They show in particular the locking member 90 and the swinging locking member 84.

Figure 15A:
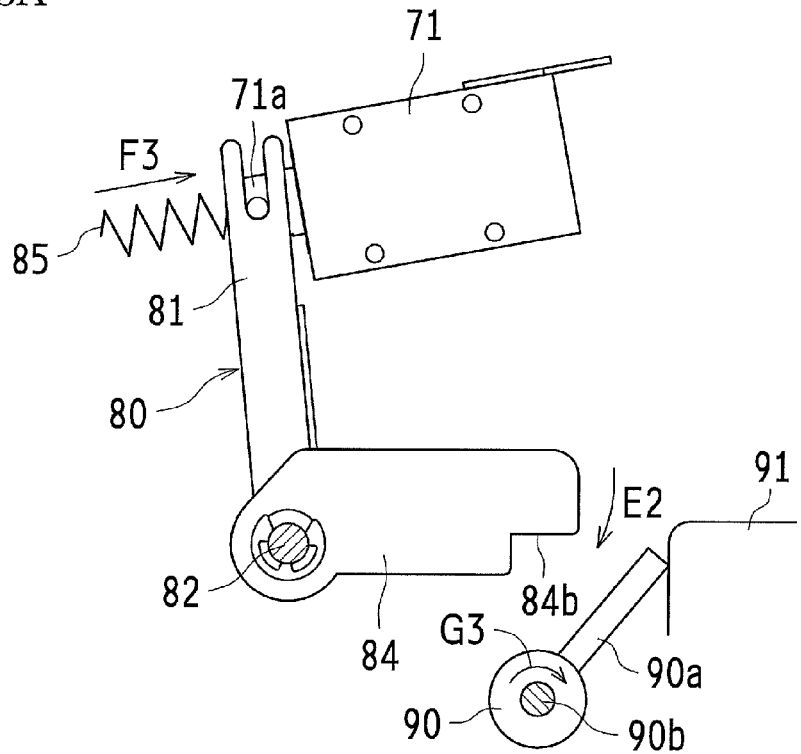
FIG. 15A is a cross-sectional view illustrating a state in which the locking member is located in the releasing position and the operation unit is turned off in the original transport device according to a third embodiment of the present invention.

FIG. 15A is a cross-sectional view illustrating the state in which the locking member is located in the releasing position and the operation unit is turned off in the original transport device according to the third embodiment of the present invention. Note that the elements having substantially the same functions as those of the first embodiment and the second embodiment will be indicated by the same reference numerals, whose description will be omitted.

In the third embodiment, the locking member 90 is supported by a locking shaft 90*b* that is different from the fixing shaft 67*a*. In contrast to the configuration of the first embodiment in which the fixing shaft 67*a* is located above the swinging locking member 84, in the configuration of the third embodiment, the locking shaft 90*b* is located below the swinging locking member 84. Furthermore, a lower end portion of the swinging locking member 84 is cut out so as to form the swinging contact portion 84*b*. The shape of the locking member 90 may be suitably formed according to the position of the locking shaft 90*b*. It is sufficient that the swinging locking member 84 does not make contact with the locking member 90 located in the releasing position.

The power of the power unit 72 is transmitted to the locking shaft 90*b* via the transmission member 73, and the locking shaft 90*b* rotates accompanied by the rotation of the fixing roller 67. Similarly to the first embodiment, the locking member 90 may rotate due to the fixing spring 67*c* and the like. The locking member 90 rotates in the direction indicated by an arrow G3, and when it makes contact with the rotation restriction portion 91, the locking shaft 90*b* idles. Similarly to the first embodiment, the position of the locking member 90 where it makes contact with the rotation restriction portion 91 so as to be stopped is the releasing position.

In the third embodiment, when the operation unit 71 is in the off state, the paper discharge rollers 66 are separated from each other. Specifically, contrary to the first embodiment, the biasing member 85 applies a biasing force F3 in the direction in which the swinging coupling member 81 comes close to the operation unit 71 (the right side in FIG. 15A), and the coupling member 71a is housed. The swinging support member 80 is biased by the biasing member 85 so as to swing toward the separating direction E2 and is stopped. As a result, the swinging locking member 84 and the roller support member 83 are separated from the fixing roller 67, which corresponds to the state in which the paper discharge rollers 66 are separated from each other in FIG. 7B. That is, the swinging locking member 84 and the roller support member 83 are located in the separate position.

Figure 15B:
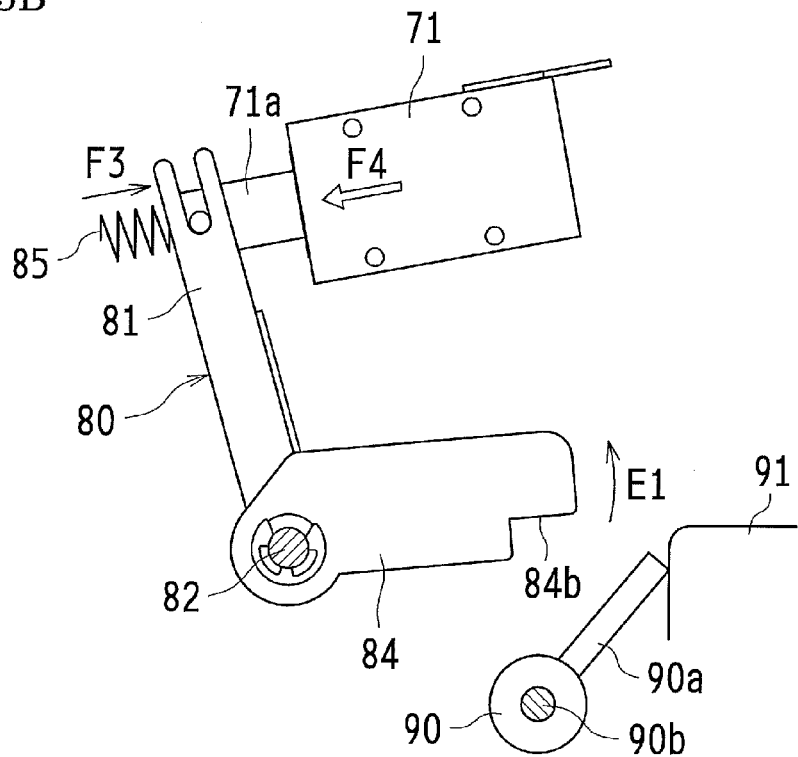
FIG. 15B is a cross-sectional view illustrating a state in which the locking member is located in the releasing position and the operation unit is turned on in the original transport device according to the third embodiment of the present invention.

FIG. 15B is a cross-sectional view illustrating the state in which the locking member is located in the releasing position and the operation unit is turned on in the original transport device according to the third embodiment of the present invention.

In FIG. 15B, the operation unit 71 is turned on from the state shown in FIG. 15A. In the third embodiment, when the operation unit 71 is turned on, the coupling member 71a, to which an operating force F4 is applied, protrudes. Similarly to the first embodiment, the operating force F4 is sufficiently strong to overcome the biasing force F3. As a result, the swinging coupling member 81 is pressed in the direction separating from the operation unit 71 (the left side in FIG. 15B). Thus, the swinging support member 80 swings toward the press-contacting direction E1 and is stopped. Here, the swinging locking member 84 and the roller support member 83 come close to the fixing roller 67, which corresponds to the state in which the paper discharge rollers 66 are press-contacted to each other in FIG. 7A. That is, the swinging locking member 84 and the roller support member 83 are located in the press-contact position. Note that the locking member 90 does not move from the state shown in FIG. 15A, that is, it is stopped in the releasing position.

Figure 15C:
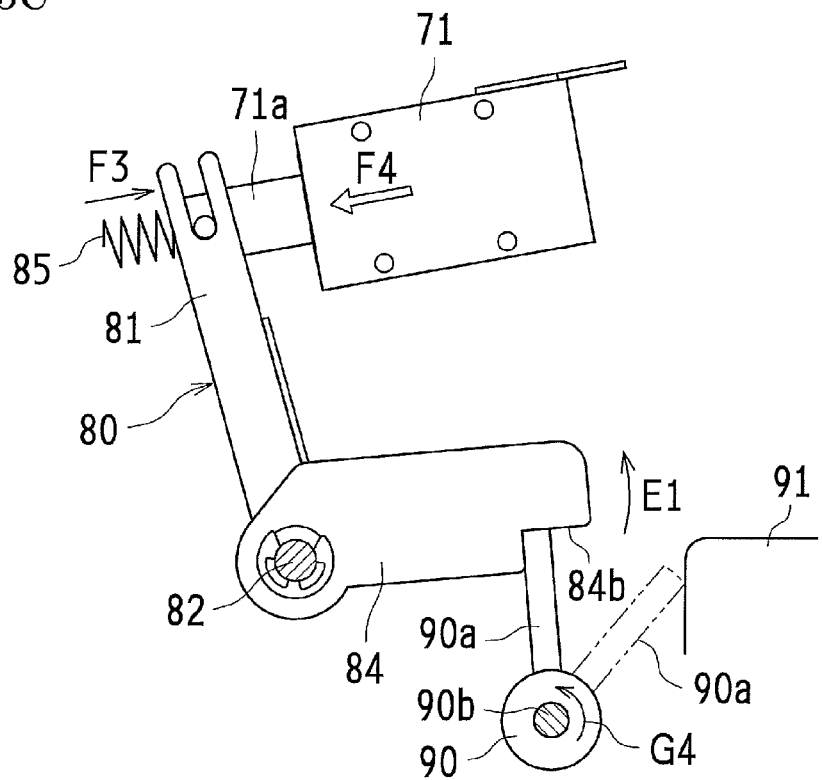
FIG. 15C is a cross-sectional view illustrating a state in which the locking member is located in the locking position and the operation unit is turned on in the original transport device according to the third embodiment of the present invention.

FIG. 15C is a cross-sectional view illustrating the state in which the locking member is located in the locking position and the operation unit is turned on in the original transport device according to the third embodiment of the present invention.

In FIG. 15C, the locking member 90 rotates in the direction indicated by an arrow G4 from the state shown in FIG. 15B. The dashed-two dotted line indicates the locking portion 90a before moving. The locking member 90 rotates according to the rotation of the locking shaft 90b so that the locking portion 90a makes contact with the swinging contact portion 84b. Similarly to the first embodiment, the position of the locking member 90 where it makes contact with the swinging locking member 84 so as to be stopped is the locking position. Since the operation unit 71 is in the on state, the swinging support member 80 is biased in the press-contacting direction E1 and is being stopped in the press-contact position.

Figure 15D:
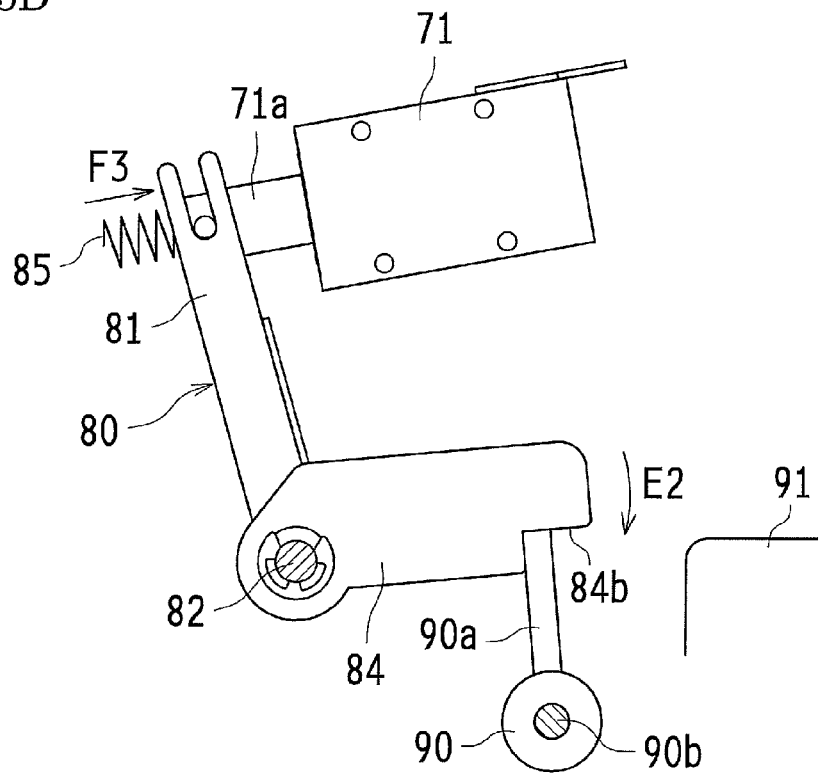
FIG. 15D is a cross-sectional view illustrating a state in which the locking member is located in the locking position and the operation unit is turned off in the original transport device according to the third embodiment of the present invention.

FIG. 15D is a cross-sectional view illustrating the state in which the locking member is located in the locking position and the operation unit is turned off in the original transport device according to the third embodiment of the present invention.

In FIG. 15D, the operation unit 71 is turned off from the state shown in FIG. 15C. When the operation unit 71 is turned off, the operating force F4 disappears, thus the swinging support member 80 is biased so as to swing toward the separating direction E2. However, similarly to the first embodiment, the locking member 90 exists in the direction in which the swinging locking member 84 swings (the lower direction), thus the swinging support member 80 is stopped in the press-contact position.

When the locking member 90 rotates in the direction indicated by the arrow G3 to move to releasing position from the state shown in FIG. 15D, the locking state of the swinging support member 80 is released so that the swinging support member 80 moves to the separate position. Thus, the state returns to the state shown in FIG. 15A.

Next, a process for transporting the original in the third embodiment will be described. In the third embodiment, similarly to the first embodiment, the original transport process indicated in FIG. 10 and the paper jam detection process indicated in FIG. 11 are simultaneously performed. Hereinafter, compared with the respective process flow charts FIGS. 10 to 13, only different procedures in the third embodiment will be described, accordingly, some parts of the description will be omitted.

In the third embodiment, the process for separating/press-contacting the paper discharge rollers 66 is different from the process in the first embodiment. Specifically, in the third embodiment, the locking process is performed so that the separated paper discharge rollers 66 are press-contacted to each other. That is, when the process is started, its state corresponds to the state shown in FIG. 15A, and the locking member 90 and the operation unit 71 are operated in the order shown in FIGS. 15B to 15D.

In step S31, the swinging support member 80 swings toward the press-contacting direction E1, which corresponds to the state shown in FIG. 15B. In step S32, the locking member 90 moves to the locking position, which corresponds to the state shown in FIG. 15C. In step S33, the paper discharge rollers 66 maintain the press-contact state, which corresponds to the state shown in FIG. 15D.

Next, the releasing process is performed so that the press-contacted paper discharge rollers 66 are separated from each other. That is, when the process is started, its state corresponds to the state shown in FIG. 15B or 15C if the operation unit 71 is in the on state. On the other hand, its state corresponds to the state shown in FIG. 15D if the operation unit 71 is not in the on state.

In step S42, when the operation unit 71 is turned off, the locking member 90 is located in the releasing position if the state is as shown in FIG. 15B. Thus, the swinging support member 80 swings toward the separate position so that the state turns to the state shown in FIG. 15A. If the state is as shown in FIG. 15C, the locking member 90 is located in the locking position. Thus, the state turns to the state shown in FIG. 15D without the swing of the swinging support member 80. Then, in step S44, the swinging support member 80 swings toward the separate position due to the movement of the locking member 90 from the locking position to the releasing position, thus the state turns to the state shown in FIG. 15A.

As described above, in the original transport process and the paper jam detection process here, the process to be actually performed is different. That is, for the original transport process, the locking process shown in FIG. 12 is performed so that the paper discharge rollers 66 are press-contacted to each other in step S12. Also, the releasing process shown in FIG. 13 is performed so that the paper discharge rollers 66 are separated from each other in step S17. Therefore, in the third embodiment, when performing the double side reading of the original, the operation unit 71 is turned off when the transport of the original is completed. Also, for the paper jam detection process, the releasing process is performed so that the paper discharge rollers 66 are separated from each other in step S22.

As described above, in the third embodiment, when the operation unit 71 is in the off state, the swinging support member 80 swings toward the direction in which the paper discharge rollers 66 are separated from each other, and when the operation unit 71 is in the on state, the swinging support member 80 swings toward the direction in which the paper discharge rollers 66 are press-contacted to each other. The locking member 90 maintains the press-contact state of the paper discharge rollers 66. With such a configuration, after the paper discharge rollers 66 are press-contacted to each other by the operation of the operation unit 71, the locking member 90 maintains the press-contact state of the paper discharge rollers 66. Thus, the operation unit 71 can be stopped. As a result, the original can be transported while reducing the operation time of the operation unit 71. Also, when the locking member 90 locks in advance the swinging support member 80, the original can be transported without operating the operation unit 71. Thus, the number of operations of the operation unit 71 can be reduced, which avoids generation of the operating noise.

In this embodiment, the locking member 90 maintains the press-contact state of the paper discharge rollers 66. Thus, the paper discharge rollers 66 can be separated from each other by releasing the locking member 90 without operating the operation unit 71.

In the first to third embodiments, the case in which the present invention is applied to the original transport path 53 of the original transport device 50 was described. However, the present invention is not limited thereto. It may be applied to the paper transport path S of the image forming apparatus 100.

Also, in the first to third embodiments, the paper discharge rollers 66 and the operation unit 71 are provided on the same side (e.g., the right side in FIG. 6) relative to the swinging coupling member 81. However, the operation unit 71 may be provided on the opposite side. That is, in the case in which the swinging coupling member 81 is disposed between the paper discharge rollers 66 and the operation unit 71, when the operation unit 71 is turned on, the paper discharge rollers 66 can be separated from each other by pushing the swinging support member 81 in the first embodiment. Also, in the third embodiment, when the operation unit 71 is turned on, the paper discharge rollers 66 can be press-contacted to each other by pulling the swinging support member 81. Thus, the coupling member 71a of the operation unit 71 can be set to be lengthened or shortened depending on the location of the operation unit 71.

The foregoing embodiments are to be considered in all respects as illustrative and not restrictive. The scope of the present invention is indicated by the appended claims rather than by the foregoing description. Furthermore, all modifications and changes that come within the meaning and range of equivalency of the claims are intended to be embraced therein.

What is claimed is:

1. An original transport device including a pair of paper discharge rollers for sandwiching and transporting an original, the paper discharge rollers being disposed in an original transport path, and being constituted by a first roller and a second roller, the second roller separating from/making contact with the first roller, comprising:

a swinging support member supporting the second roller and swinging so that the second roller is separated from/press-contacted to the first roller;

an operation unit coupled to the swinging support member so as to swing the swinging support member; and a locking member locking the swinging support member so as to stop the swing of the swinging support member, wherein the locking member locks the swinging support member so that the paper discharge rollers are in a separate state or a press-contact state when the operation unit is driven, wherein after the operation unit is turned to a non-driven state, the locking member maintains the separate state or the press-contact state of the paper discharge rollers during driving of the operation unit, wherein the swinging support member swings toward a direction in which the paper discharge rollers are press-contacted to each other when the operation unit is not driven, and swings toward a direction in which the paper discharge rollers are separated from each other when the operation unit is driven, and wherein the locking member maintains the separate state of the paper discharge rollers.

2. The original transport device according to claim 1, wherein the operation unit is driven by a solenoid, wherein the operation unit being driven biases the swinging support member in one direction, and wherein the operation unit not being driven applies no load to the swinging support member.

3. The original transport device according to claim 2, further comprising a biasing member being coupled to the swinging support member so as to bias the swinging support member in a direction opposite to the direction in which the operation unit biases the swinging support member.

4. The original transport device according to claim 1, further comprising an original detection sensor detecting a position of the original in the original transport path, wherein it is detected that a paper jam exists in the original transport path based on the position of the original detected by the original detection sensor so that the paper discharge rollers are separated from each other.

5. The original transport device according to claim 1, further comprising a power unit rotating the first roller forward and backward, wherein the locking member moves, accompanied by the rotation of the first roller, between a locking position for locking the swinging support member and a releasing position separated from the swinging support member.

6. An image forming apparatus comprising the original transport device according to claim 1.

7. An original transport device including a pair of paper discharge rollers for sandwiching and transporting an original, the paper discharge rollers being disposed in an original transport path, and being constituted by a first roller and a second roller, the second roller separating from/making contact with the first roller, comprising:

a swinging support member supporting the second roller and swinging so that the second roller is separated from/press-contacted to the first roller;

an operation unit coupled to the swinging support member so as to swing the swinging support member; and a locking member locking the swinging support member so as to stop the swing of the swinging support member, wherein the locking member locks the swinging support member so that the paper discharge rollers are in a separate state or a press-contact state when the operation unit is driven, wherein after the operation unit is turned to a non-driven state, the locking member maintains the separate state or the press-contact state of the paper discharge rollers during driving of the operation unit, wherein the operation unit is driven by a solenoid, wherein the operation unit being driven biases the swinging support member in one direction, and wherein the operation unit not being driven applies no load to the swinging support member.

8. The original transport device according to claim 7, wherein the swinging support member swings toward a direction in which the paper discharge rollers are separated from each other when the operation unit is not driven, and swings toward a direction in which the paper discharge rollers are press-contacted to each other when the operation unit is driven, and wherein the locking member maintains the press-contact state of the paper discharge rollers.

9. The original transport device according to claim 7, further comprising a biasing member being coupled to the swinging support member so as to bias the swinging support member in a direction opposite to the direction in which the operation unit biases the swinging support member.

10. The original transport device according to claim 7, further comprising an original detection sensor detecting a position of the original in the original transport path, wherein it is detected that a paper jam exists in the original transport path based on the position of the original detected by the original detection sensor so that the paper discharge rollers are separated from each other.

11. The original transport device according to claim 7, further comprising a power unit rotating the first roller forward and backward, wherein the locking member moves, accompanied by the rotation of the first roller, between a locking position for locking the swinging support member and a releasing position separated from the swinging support member.

12. An image forming apparatus comprising the original transport device according to claim 7.

13. An original transport device including a pair of paper discharge rollers for sandwiching and transporting an original, the paper discharge rollers being disposed in an original transport path, and being constituted by a first roller and a second roller, the second roller separating from/making contact with the first roller, comprising:

a swinging support member supporting the second roller and swinging so that the second roller is separated from/press-contacted to the first roller;

an operation unit coupled to the swinging support member so as to swing the swinging support member;

a locking member locking the swinging support member so as to stop the swing of the swinging support member; and a power unit rotating the first roller forward and backward, wherein the locking member locks the swinging support member so that the paper discharge rollers are in a separate state or a press-contact state when the operation unit is driven, wherein after the operation unit is turned to a non-driven state, the locking member maintains the separate state or the press-contact state of the paper discharge rollers during driving of the operation unit, and wherein the locking member moves, accompanied by the rotation of the first roller, between a locking position for locking the swinging support member and a releasing position separated from the swinging support member.

14. The original transport device according to claim 13, wherein the swinging support member swings toward a direction in which the paper discharge rollers are separated from each other when the operation unit is not driven, and swings toward a direction in which the paper discharge rollers are press-contacted to each other when the operation unit is driven, and wherein the locking member maintains the press-contact state of the paper discharge rollers.

15. The original transport device according to claim 13, further comprising a biasing member being coupled to the swinging support member so as to bias the swinging support member in a direction opposite to the direction in which the operation unit biases the swinging support member, wherein the operation unit is driven by a solenoid, wherein the operation unit being driven biases the swinging support member in one direction, and wherein the operation unit not being driven applies no load to the swinging support member.

16. The original transport device according to claim 13, further comprising an original detection sensor detecting a position of the original in the original transport path, wherein it is detected that a paper jam exists in the original transport path based on the position of the original detected by the original detection sensor so that the paper discharge rollers are separated from each other.

17. An image forming apparatus comprising the original transport device according to claim 13.

* * * * *